(12) United States Patent
Adams

(10) Patent No.: US 12,338,848 B2
(45) Date of Patent: Jun. 24, 2025

(54) ANTI-WOBBLE FIR TREE MOUNT

(71) Applicant: HellermannTyton Corporation, Milwaukee, WI (US)

(72) Inventor: Scott J. Adams, Menomonee Falls, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 127 days.

(21) Appl. No.: 18/321,570

(22) Filed: May 22, 2023

(65) Prior Publication Data
US 2024/0003374 A1    Jan. 4, 2024

Related U.S. Application Data

(60) Provisional application No. 63/367,461, filed on Jun. 30, 2022.

(51) Int. Cl.
*F16B 21/08*    (2006.01)

(52) U.S. Cl.
CPC .................. *F16B 21/084* (2013.01)

(58) Field of Classification Search
CPC .................................................... F16B 21/084
(Continued)

(56) References Cited

U.S. PATENT DOCUMENTS

| | | |
|---|---|---|
| 639,169 A | 12/1899 | Goff et al. |
| 1,308,869 A | 7/1919 | Rohmer |

(Continued)

FOREIGN PATENT DOCUMENTS

| | | |
|---|---|---|
| CN | 1144313 | 3/1997 |
| CN | 101180488 | 5/2008 |

(Continued)

OTHER PUBLICATIONS

"8mm Blind Hole Mount with T50 Saddle", Drawing No. Qt23-596-102-CSU, Mar. 7, 2023, 1 page.

(Continued)

*Primary Examiner* — Flemming Saether
(74) *Attorney, Agent, or Firm* — Colby Nipper PLLC

(57) ABSTRACT

This document describes anti-wobble fir tree mounts for attaching a component to a supporting structure. In aspects, an anti-wobble fir tree mount is configured for reducing the lateral movement of the anti-wobble fir tree mount during use. In some implementations, the device may include a body section having a bottom portion with a mounting section extending therefrom. The mounting section is configured for insertion into a mounting aperture defined in a supporting structure first side. The mounting section having: a mounting stud; first and second branches extending from the mounting stud; the second branch spaced apart from the first branch, the first branch positioned between the body section and the second branch, the second branch may include an upper side facing the body section, the first branch may include: a lower side, the lower side facing the upper side of the second branch; and a flange member extending from the lower side, the flange member configured for contacting the upper side during insertion of the mounting section into the mounting aperture to limit a deflection of the second branch in the direction of the body section.

20 Claims, 7 Drawing Sheets

(58) Field of Classification Search
USPC .......................................................... 411/510
See application file for complete search history.

(56) References Cited

U.S. PATENT DOCUMENTS

| | | |
|---|---|---|
| 1,313,372 A | 8/1919 | Doge |
| 1,365,626 A | 1/1921 | Pleister et al. |
| 1,434,001 A | 10/1922 | Gilbert et al. |
| 1,437,144 A | 11/1922 | Isaacson |
| 2,278,691 A | 3/1938 | Cotter |
| 2,193,291 A | 3/1940 | Marchins |
| 2,278,601 A | 4/1942 | Werndl |
| 2,694,997 A | 12/1952 | Alger |
| 2,884,214 A | 4/1959 | Wrobel |
| 2,940,145 A | 6/1960 | Ferberg |
| 2,945,713 A | 7/1960 | Sears |
| 2,952,238 A | 9/1960 | Barber et al. |
| 2,969,216 A | 1/1961 | Hallsey |
| 3,024,509 A | 3/1962 | Hamann |
| 3,149,808 A | 9/1964 | Weckesser |
| 3,250,505 A | 5/1966 | Rodman et al. |
| 3,252,677 A | 5/1966 | Raymond |
| 3,276,800 A | 10/1966 | Loudon et al. |
| 3,463,427 A | 8/1969 | Fisher |
| 3,483,787 A * | 12/1969 | Saunders .............. F16B 19/004 411/510 |
| 3,486,725 A | 12/1969 | Hidassy |
| 3,504,937 A | 4/1970 | Panovic |
| 3,525,129 A | 8/1970 | Holton |
| 3,581,349 A | 6/1971 | Verspieren |
| 3,605,199 A | 9/1971 | Eberhardt |
| 3,632,069 A | 1/1972 | Thayer et al. |
| 3,632,070 A | 1/1972 | Thayer et al. |
| 3,632,071 A | 1/1972 | Cameron et al. |
| 3,673,643 A | 7/1972 | Kindell |
| 3,705,708 A | 12/1972 | Cunningham |
| 3,737,128 A | 6/1973 | Schuplin |
| 3,810,279 A | 5/1974 | Swick et al. |
| 3,913,876 A | 10/1975 | McSherry |
| 3,921,496 A | 11/1975 | Helderman |
| 4,037,978 A | 7/1977 | Connelly |
| 4,043,579 A | 8/1977 | Meyer |
| 1,119,284 A | 10/1978 | Belmont |
| 4,119,284 A | 10/1978 | Belmont |
| 4,128,220 A | 12/1978 | McNeel |
| 4,141,116 A | 2/1979 | Zalonis |
| 4,220,300 A | 9/1980 | Reicher et al. |
| 4,264,047 A | 4/1981 | Nelson et al. |
| 4,318,518 A | 3/1982 | Davis |
| 4,386,752 A | 6/1983 | Pavlak et al. |
| 4,396,329 A | 8/1983 | Wollar |
| 4,402,641 A | 9/1983 | Artf |
| 4,427,328 A | 1/1984 | Kojima |
| 4,445,255 A | 5/1984 | Olejak |
| D274,214 S | 6/1984 | De Vos |
| 4,472,918 A | 9/1984 | Mach |
| 4,490,886 A | 1/1985 | Omata |
| D277,546 S | 2/1985 | Trotta |
| 4,509,710 A | 4/1985 | Cooper et al. |
| 4,517,710 A | 5/1985 | Beckmann |
| 4,552,481 A | 11/1985 | Bluett |
| 4,609,171 A | 9/1986 | Matsui |
| 4,626,121 A | 12/1986 | Tajima et al. |
| 4,652,192 A | 3/1987 | Schaller |
| 4,665,588 A | 5/1987 | Nakano |
| 4,688,961 A | 8/1987 | Shioda et al. |
| 4,705,245 A | 11/1987 | Osada |
| 4,705,442 A | 11/1987 | Fucci |
| 4,709,654 A | 12/1987 | Smith |
| 4,728,238 A * | 3/1988 | Chisholm ............. F16B 19/004 411/510 |
| 4,766,651 A | 8/1988 | Kobayashi |
| 4,768,741 A | 9/1988 | Logson |
| 4,779,828 A | 10/1988 | Munch |
| 4,812,826 A | 3/1989 | Kaufman et al. |
| 4,817,901 A | 4/1989 | Kuo et al. |
| 4,818,119 A | 4/1989 | Busch et al. |
| 4,865,281 A | 9/1989 | Wollar |
| 4,875,647 A | 10/1989 | Takagi et al. |
| 4,878,791 A | 11/1989 | Kurihara et al. |
| 4,900,210 A | 2/1990 | Buchanan |
| 4,902,182 A | 2/1990 | Lewis |
| 4,910,831 A | 3/1990 | Bingold |
| 4,919,373 A | 4/1990 | Caveney et al. |
| 4,920,618 A | 5/1990 | Iguchi |
| 4,925,136 A | 5/1990 | Knott |
| 4,930,951 A | 6/1990 | Gilliam |
| 4,936,530 A | 6/1990 | Wollar |
| 4,938,645 A | 7/1990 | Wollar |
| 4,944,475 A | 7/1990 | Ono et al. |
| 4,955,749 A | 9/1990 | Panovic |
| 4,976,578 A | 12/1990 | Mathes et al. |
| 4,993,669 A | 2/1991 | Dyer |
| 4,993,903 A | 2/1991 | Kraus |
| D315,673 S | 3/1991 | Paul |
| 5,039,267 A | 8/1991 | Wollar |
| 5,040,752 A | 8/1991 | Morrison |
| D319,571 S | 9/1991 | Bennett et al. |
| D323,106 S | 1/1992 | Daigle et al. |
| 5,088,158 A | 2/1992 | Burkholder et al. |
| 5,102,075 A | 4/1992 | Dyer |
| D326,404 S | 5/1992 | Spell |
| 5,127,577 A | 7/1992 | Lynch |
| 5,131,613 A | 7/1992 | Kamiya et al. |
| 5,148,981 A | 9/1992 | Lynch |
| 5,203,278 A | 4/1993 | Kinney |
| 5,221,065 A | 6/1993 | Siems et al. |
| 5,224,244 A | 7/1993 | Ikeda et al. |
| 5,288,189 A | 2/1994 | Hepworth |
| 5,305,978 A | 4/1994 | Current |
| 5,306,098 A | 4/1994 | Lewis |
| D347,156 S | 5/1994 | Starrett et al. |
| 5,324,151 A | 6/1994 | Szudarek et al. |
| 5,328,290 A | 7/1994 | Plastina |
| 5,332,179 A | 7/1994 | Kuffel et al. |
| 5,333,822 A | 8/1994 | Benoit et al. |
| 5,337,983 A | 8/1994 | Mailey |
| 5,344,112 A | 9/1994 | Peterson et al. |
| 5,347,690 A | 9/1994 | Mansoor |
| 5,354,021 A | 10/1994 | Farrell |
| 5,367,750 A | 11/1994 | Ward et al. |
| 5,368,261 A | 11/1994 | Caveney et al. |
| 5,385,321 A | 1/1995 | Kume et al. |
| 5,386,615 A | 2/1995 | Bernard |
| 5,388,791 A | 2/1995 | Mccrory |
| 5,390,876 A | 2/1995 | Hatano et al. |
| 5,393,185 A * | 2/1995 | Duffy, Jr. .............. F16B 21/084 411/908 |
| 5,398,383 A | 3/1995 | Bingold |
| D362,174 S | 9/1995 | Sachs |
| 5,468,108 A | 11/1995 | Sullivan et al. |
| 5,494,245 A | 2/1996 | Suzuki et al. |
| 5,494,336 A | 2/1996 | Russell |
| 5,533,237 A | 7/1996 | Higgins |
| 5,538,208 A | 7/1996 | Cordes et al. |
| D372,665 S | 8/1996 | Kim |
| 5,544,555 A | 8/1996 | Corley et al. |
| 5,563,450 A | 10/1996 | Bader |
| 5,598,994 A | 2/1997 | Olewinski et al. |
| 5,601,260 A | 2/1997 | Shinohara et al. |
| 5,601,261 A | 2/1997 | Koike |
| 5,636,937 A | 6/1997 | Zemlicka |
| 5,653,409 A | 8/1997 | White et al. |
| 5,664,754 A | 9/1997 | Gaenslen |
| 5,669,731 A | 9/1997 | Hironaka et al. |
| D384,877 S | 10/1997 | Perrin |
| 5,704,573 A | 1/1998 | de Beers et al. |
| 5,718,025 A | 2/1998 | Courtin |
| 5,718,633 A | 2/1998 | Gehrke |
| 5,730,399 A | 3/1998 | Baginski |
| 5,732,446 A | 3/1998 | Blanks |
| 5,759,004 A | 6/1998 | Kuffel |
| 5,762,299 A | 6/1998 | Kuffel |
| 5,765,787 A | 6/1998 | de Beers et al. |

(56) References Cited

U.S. PATENT DOCUMENTS

| | | |
|---|---|---|
| 5,774,944 A | 7/1998 | Choi |
| 5,791,850 A | 8/1998 | Mundt |
| 5,806,812 A | 9/1998 | Jacobs et al. |
| 5,813,810 A | 9/1998 | Izume |
| 5,820,048 A | 10/1998 | Shereyk et al. |
| 5,820,083 A | 10/1998 | Geiger |
| 5,862,927 A | 1/1999 | Tebeau |
| 5,884,367 A | 3/1999 | Teagno et al. |
| 5,887,319 A | 3/1999 | Smith |
| 5,890,265 A | 4/1999 | Christian et al. |
| 5,907,891 A | 6/1999 | Meyer |
| 5,921,510 A | 7/1999 | Benoit et al. |
| 5,922,949 A | 7/1999 | Nakajima |
| 5,926,921 A | 7/1999 | Benoit |
| 5,937,488 A | 8/1999 | Geiwer |
| 5,941,483 A | 8/1999 | Baginski |
| 5,966,781 A | 10/1999 | Geiger |
| D417,142 S | 11/1999 | Kim |
| D417,387 S | 12/1999 | Kim |
| D417,838 S | 12/1999 | Kim |
| 6,003,208 A | 12/1999 | Christian et al. |
| D424,922 S | 5/2000 | Sherman et al. |
| 6,074,150 A | 6/2000 | Shinozaki et al. |
| 6,105,908 A | 8/2000 | Kraus |
| 6,151,761 A | 11/2000 | Thompson |
| 6,158,933 A | 12/2000 | Nicholson |
| 6,196,033 B1 | 3/2001 | Dowdle |
| 6,196,751 B1 | 3/2001 | Khokhar |
| 6,203,240 B1 | 3/2001 | Hironaka et al. |
| 6,240,602 B1 | 6/2001 | Geiger |
| 6,253,421 B1 | 7/2001 | Kraus |
| D447,048 S | 8/2001 | Beloff |
| 6,320,134 B1 | 11/2001 | Rehberg et al. |
| 6,364,257 B1 | 4/2002 | Holder |
| 6,381,811 B2 | 5/2002 | Smith et al. |
| 6,398,169 B1 | 6/2002 | Streit |
| 6,398,312 B1 | 6/2002 | Marczynski et al. |
| 6,443,403 B1 | 9/2002 | Page et al. |
| 6,532,631 B2 | 3/2003 | Rohaly et al. |
| 6,533,226 B2 | 3/2003 | Geiger |
| 6,536,718 B2 | 3/2003 | Benito-Navazo |
| 6,550,723 B2 | 4/2003 | Fraley et al. |
| D474,679 S | 5/2003 | Malin |
| 6,560,822 B2 | 5/2003 | Caveney et al. |
| 6,592,083 B1 | 7/2003 | Hobson et al. |
| 6,595,597 B2 | 7/2003 | Marcynski et al. |
| D480,291 S | 10/2003 | Sorkin |
| 6,634,063 B2 | 10/2003 | Joseph |
| D483,795 S | 12/2003 | Morgan et al. |
| D484,400 S | 12/2003 | Blake et al. |
| 6,655,644 B1 | 12/2003 | Gretz |
| 6,669,150 B2 | 12/2003 | Benoit |
| 6,669,426 B1 | 12/2003 | Detter et al. |
| 6,718,597 B2 | 4/2004 | Geiger |
| 6,719,513 B1 | 4/2004 | Moutousis et al. |
| 6,732,982 B1 | 5/2004 | Messinger |
| 6,732,983 B1 | 5/2004 | Blake et al. |
| 6,745,439 B2 | 6/2004 | Browniee et al. |
| 6,749,157 B2 | 6/2004 | Takeuchi |
| 6,807,714 B2 | 10/2004 | O'Young et al. |
| 6,809,257 B2 | 10/2004 | Shibuya |
| D507,481 S | 7/2005 | Blake et al. |
| D516,904 S | 3/2006 | Kendrick |
| 7,012,511 B2 | 3/2006 | Hayes |
| 7,048,461 B2 | 5/2006 | Williams |
| D522,852 S | 6/2006 | Nawrocki |
| D523,330 S | 6/2006 | Mattesky |
| 7,055,783 B2 | 6/2006 | Rosemann et al. |
| 7,114,686 B2 | 10/2006 | Andrigo |
| 7,114,687 B2 | 10/2006 | Swantner et al. |
| D532,291 S | 11/2006 | Geers |
| 7,131,168 B2 | 11/2006 | Pangallo |
| 7,186,068 B2 | 3/2007 | Zoubek et al. |
| 7,222,925 B2 | 5/2007 | Yu et al. |
| D545,183 S | 6/2007 | French et al. |
| 7,374,249 B2 | 5/2008 | Willmer |
| 7,375,282 B2 | 5/2008 | James |
| D570,673 S | 6/2008 | Geiger et al. |
| D572,129 S | 7/2008 | Keays |
| 7,415,888 B2 | 8/2008 | Marczynski |
| 7,437,804 B1 | 10/2008 | Geiger et al. |
| 7,448,579 B2 | 11/2008 | Kwilosz |
| 7,503,528 B2 | 3/2009 | Adams et al. |
| 7,510,361 B2 * | 3/2009 | Mostazo-Oviedo .... F16B 13/02 411/510 |
| D600,543 S | 9/2009 | Coles |
| 7,594,629 B2 | 9/2009 | Smutny et al. |
| 7,614,836 B2 | 11/2009 | Mohiuddin et al. |
| 7,640,707 B2 | 1/2010 | Johnson et al. |
| 7,661,631 B2 | 2/2010 | Ibaraki |
| 7,661,633 B2 | 2/2010 | Igarashi et al. |
| D613,589 S | 4/2010 | Goodman et al. |
| D616,431 S | 5/2010 | Hijmans |
| 7,753,320 B2 | 7/2010 | Geiger et al. |
| 7,753,321 B2 | 7/2010 | Geiger |
| 7,757,997 B2 | 7/2010 | Smutny et al. |
| D623,508 S | 9/2010 | Reichle et al. |
| 7,793,895 B2 | 9/2010 | Franks |
| 7,808,627 B2 | 10/2010 | Voeller |
| 7,862,272 B2 | 1/2011 | Nakajima |
| D631,739 S | 2/2011 | Craig et al. |
| 7,887,012 B2 | 2/2011 | Desai et al. |
| 7,891,926 B2 | 2/2011 | Jakson |
| 7,896,601 B2 | 3/2011 | Kalyanadurga et al. |
| 7,994,901 B2 | 8/2011 | Malis et al. |
| 8,020,812 B2 | 9/2011 | Matsuno et al. |
| 8,025,258 B2 | 9/2011 | Eldridge |
| 8,028,962 B2 | 10/2011 | Geiger |
| 8,047,739 B2 | 11/2011 | Sellers et al. |
| 8,152,405 B2 | 4/2012 | Dubost et al. |
| 8,177,173 B2 | 5/2012 | Spiess |
| 8,221,042 B2 | 7/2012 | Vitali |
| D665,245 S | 8/2012 | Nakazato |
| 8,240,343 B2 | 8/2012 | Dyer et al. |
| D666,478 S | 9/2012 | Chou |
| 8,282,047 B2 | 10/2012 | Franks |
| 8,286,924 B2 | 10/2012 | Sano et al. |
| D671,391 S | 11/2012 | Komeno et al. |
| 8,328,457 B2 | 12/2012 | Werth |
| 8,333,514 B2 | 12/2012 | Weimer |
| D685,626 S | 7/2013 | Komeno et al. |
| D686,487 S | 7/2013 | Handa et al. |
| D686,910 S | 7/2013 | Towell |
| 8,533,919 B2 * | 9/2013 | Schliessner .......... F16B 5/0685 24/297 |
| D691,026 S | 10/2013 | Komeno et al. |
| D691,460 S | 10/2013 | Stanic et al. |
| 8,544,229 B2 | 10/2013 | Kilgore et al. |
| 8,636,454 B2 | 1/2014 | Okada et al. |
| 8,708,289 B2 | 4/2014 | Allenbach et al. |
| 8,708,627 B2 | 4/2014 | Davies |
| D708,044 S | 7/2014 | Komeno et al. |
| D709,354 S | 7/2014 | Komeno et al. |
| 8,772,636 B2 | 7/2014 | Yamaguchi et al. |
| 8,833,706 B2 | 9/2014 | Elsmore et al. |
| D716,137 S | 10/2014 | Szymanski |
| D716,138 S | 10/2014 | Szymanski |
| 8,870,135 B2 | 10/2014 | Grubbs |
| 8,872,668 B2 | 10/2014 | Schnare |
| D716,641 S | 11/2014 | Goodman et al. |
| D722,491 S | 2/2015 | Ramsauer |
| D722,492 S | 2/2015 | Ramsauer |
| D722,493 S | 2/2015 | Ramsauer |
| 8,967,556 B2 | 3/2015 | Meyers et al. |
| 8,979,039 B2 | 3/2015 | Shiga |
| 8,991,774 B2 | 3/2015 | Hajduch |
| D730,161 S | 5/2015 | Veilleux |
| D732,382 S | 6/2015 | Zalanca |
| D736,063 S | 8/2015 | White |
| D736,595 S | 8/2015 | Moore et al. |
| D737,116 S | 8/2015 | Lussier et al. |
| D739,221 S | 9/2015 | Sendra-gonzalez et al. |
| D740,367 S | 10/2015 | White |
| D743,184 S | 11/2015 | Lin |

(56) References Cited

U.S. PATENT DOCUMENTS

| | | |
|---|---|---|
| 9,188,247 B2 | 11/2015 | Pauchet et al. |
| D744,319 S | 12/2015 | White |
| D756,202 S | 5/2016 | Ledue |
| D759,475 S | 6/2016 | Banno |
| D759,476 S | 6/2016 | Iwahara et al. |
| D762,105 S | 7/2016 | Prevost et al. |
| D763,066 S | 8/2016 | Sugimoto |
| D767,372 S | 9/2016 | Itou et al. |
| D769,107 S | 10/2016 | Mclaren Hall |
| D770,886 S | 11/2016 | Whitaker |
| D774,872 S | 12/2016 | Prevost et al. |
| D774,880 S | 12/2016 | Wirth |
| D787,925 S | 5/2017 | Moerer |
| 9,653,901 B2 | 5/2017 | Miyamoto et al. |
| D793,215 S | 8/2017 | Gallion et al. |
| 9,718,591 B2 | 8/2017 | Lu et al. |
| D804,942 S | 12/2017 | Toll et al. |
| D811,869 S | 3/2018 | Gallion et al. |
| D815,939 S | 4/2018 | Geiger et al. |
| D816,471 S | 5/2018 | Gallion et al. |
| D824,622 S | 7/2018 | Toll et al. |
| 10,036,487 B2 | 7/2018 | Duggan |
| D829,090 S | 9/2018 | Toll et al. |
| D829,540 S | 10/2018 | Gallion et al. |
| 10,119,631 B2 | 11/2018 | Toll et al. |
| 10,316,991 B2 | 6/2019 | Gallion |
| 10,323,774 B2 | 6/2019 | Van Hulst et al. |
| 10,348,076 B2 | 7/2019 | Gallion et al. |
| 10,399,516 B2 | 9/2019 | Chapman |
| 10,634,180 B2 * | 4/2020 | Sawada ............... F16B 21/084 |
| 10,903,632 B2 | 1/2021 | Toll et al. |
| D909,843 S | 2/2021 | Van Hulst et al. |
| D909,844 S | 2/2021 | Van Hulst et al. |
| 10,982,795 B2 | 4/2021 | Tally et al. |
| 11,209,030 B2 | 12/2021 | Vaughn et al. |
| D948,304 S | 4/2022 | Hulst et al. |
| D948,981 S | 4/2022 | Van Hulst et al. |
| 11,355,905 B2 | 6/2022 | Toll et al. |
| 11,505,378 B2 | 11/2022 | Geiger et al. |
| 2002/0001502 A1 | 1/2002 | Smith et al. |
| 2002/0104196 A1 | 8/2002 | Geiger |
| 2002/0109050 A1 | 8/2002 | Winton, III |
| 2002/0179780 A1 | 12/2002 | Benoit et al. |
| 2003/0189140 A1 | 10/2003 | Takeuchi |
| 2003/0231943 A1 | 12/2003 | Detter et al. |
| 2004/0072457 A1 | 4/2004 | Conway |
| 2004/0076465 A1 | 4/2004 | Geiger |
| 2005/0097851 A1 | 5/2005 | Lubera et al. |
| 2005/0116122 A1 | 6/2005 | Nakanishi |
| 2005/0217082 A1 | 10/2005 | Vassiliou |
| 2005/0242247 A1 | 11/2005 | Geiger |
| 2005/0253025 A1 | 11/2005 | Benoit et al. |
| 2006/0130286 A1 | 6/2006 | Igarashi et al. |
| 2006/0239796 A1 | 10/2006 | Franks |
| 2007/0023586 A1 | 2/2007 | Geiger |
| 2007/0034769 A1 | 2/2007 | Kwilosz |
| 2007/0065256 A1 | 3/2007 | Wakabayashi |
| 2007/0102594 A1 | 5/2007 | Geiger et al. |
| 2007/0134073 A1 | 6/2007 | Shereyk et al. |
| 2007/0272807 A1 | 11/2007 | Takagaki |
| 2007/0284486 A1 | 12/2007 | Smutny et al. |
| 2008/0267686 A1 | 10/2008 | Blanks |
| 2008/0271297 A1 | 11/2008 | Dubost |
| 2008/0296444 A1 | 12/2008 | Geiger |
| 2009/0207008 A1 | 8/2009 | Malis et al. |
| 2009/0307883 A1 | 12/2009 | Schliessner |
| 2010/0207001 A1 | 8/2010 | Smith et al. |
| 2010/0223765 A1 | 9/2010 | Vitali |
| 2010/0243824 A1 | 9/2010 | Desai et al. |
| 2011/0116890 A1 | 5/2011 | Okada |
| 2011/0133046 A1 | 6/2011 | Lemerise et al. |
| 2011/0239412 A1 | 10/2011 | Sano et al. |
| 2012/0217354 A1 | 8/2012 | Walraven et al. |
| 2012/0217355 A1 | 8/2012 | Geiger et al. |
| 2012/0227221 A1 | 9/2012 | Whitaker et al. |
| 2013/0001373 A1 | 1/2013 | Ogawa |
| 2013/0119208 A1 | 5/2013 | Geiger |
| 2013/0160246 A1 | 6/2013 | Hajduch |
| 2014/0151514 A1 | 6/2014 | Asai |
| 2016/0001944 A1 | 1/2016 | Aoyama |
| 2016/0108946 A1 | 4/2016 | Zajak et al. |
| 2016/0114743 A1 | 4/2016 | Miyamoto et al. |
| 2016/0223100 A1 | 8/2016 | Geiger |
| 2016/0320034 A1 | 11/2016 | Wessel |
| 2017/0059060 A1 | 3/2017 | Gallion et al. |
| 2017/0146154 A1 | 5/2017 | Tally et al. |
| 2017/0227141 A1 | 8/2017 | Toll et al. |
| 2017/0297516 A1 | 10/2017 | Loebe |
| 2018/0058609 A1 | 3/2018 | Van Hulst et al. |
| 2018/0274699 A1 | 9/2018 | Ratzlaff et al. |
| 2019/0036314 A1 | 1/2019 | Toll et al. |
| 2019/0136896 A1 | 5/2019 | Classen et al. |
| 2019/0331258 A1 | 10/2019 | Geiger et al. |
| 2021/0119430 A1 | 4/2021 | Toll et al. |
| 2022/0239080 A1 | 7/2022 | Toll et al. |
| 2023/0304608 A1 | 9/2023 | Brucker et al. |
| 2024/0209961 A1 | 6/2024 | Hopkins et al. |
| 2024/0271652 A1 | 8/2024 | Klos et al. |
| 2024/0426420 A1 | 12/2024 | Cottrill et al. |

FOREIGN PATENT DOCUMENTS

| | | |
|---|---|---|
| CN | 102472415 | 5/2012 |
| CN | 103998843 | 8/2014 |
| CN | 107923555 | 4/2018 |
| CN | 108457938 | 8/2018 |
| DE | 1275650 | 8/1968 |
| DE | 3542669 | 6/1987 |
| DE | 19856945 | 6/2000 |
| DE | 102006025706 | 12/2007 |
| DE | 202007013238 | 2/2009 |
| DE | 102009004546 | 7/2011 |
| EP | 943240 | 10/1961 |
| EP | 0069223 | 1/1983 |
| EP | 1887232 | 2/2008 |
| EP | 1975491 | 10/2008 |
| EP | 2056419 | 5/2009 |
| EP | 2058242 | 5/2009 |
| EP | 3228880 | 10/2017 |
| EP | 3341638 | 7/2018 |
| EP | 2141397 | 1/2020 |
| FR | 2322286 | 3/1977 |
| FR | 2437086 | 4/1980 |
| GB | 191305836 | 10/1913 |
| GB | 191505836 | 4/1916 |
| GB | 933929 | 8/1963 |
| GB | 1451009 | 9/1976 |
| GB | 2129863 | 5/1984 |
| GB | 5836 | 3/2013 |
| JP | H01174612 | 7/1989 |
| JP | H0543721 | 6/1993 |
| JP | H07322278 | 12/1995 |
| JP | H11230137 | 8/1999 |
| JP | H11257317 | 9/1999 |
| JP | 2002199555 | 7/2002 |
| JP | 2003329021 | 11/2003 |
| JP | 2005016718 | 1/2005 |
| JP | 2005527752 | 9/2005 |
| JP | 2008281168 | 11/2008 |
| JP | 2010047141 | 3/2010 |
| JP | 2010156465 | 7/2010 |
| JP | 2012057778 | 3/2012 |
| JP | 2013118741 | 6/2013 |
| JP | 2013143842 | 7/2013 |
| JP | 2014108032 | 6/2014 |
| JP | 2014138517 | 7/2014 |
| JP | 2018071733 A | 5/2018 |
| JP | 2018532955 | 11/2018 |
| KR | 20180032618 | 3/2018 |
| RU | 2535452 | 12/2014 |
| WO | 0025031 A1 | 5/2000 |

(56) References Cited

FOREIGN PATENT DOCUMENTS

| WO | 2006113867 | 10/2006 |
|---|---|---|
| WO | 2017035358 | 3/2017 |

OTHER PUBLICATIONS

"Cable Strap for Blind Hole", Part N. 251920, p. 3—https://media.araymond.com/raygroup/image/upload/Public/New-standard-parts-cable-management-clips.pdf, Jun. 23, 2020, 4 pages.
"Extended European Search Report", EP Application No. 16840125.5, Mar. 1, 2019, 10 pages.
"Final Office Action", U.S. Appl. No. 15/247,444, Jun. 14, 2018, 13 pages.
"HT-Germany Metal Barbed Fir Tree", Drawing No. 07-0419-001-PDS, Jul. 4, 2015, 1 page.
"HT-Germany Metal Barbed Fir Tree", Drawing No. 13-0412-001-PDS, Sep. 1, 2014, 1 page.
"International Search Report and Written Opinion", Application No. PCT/US2016/048705, Oct. 28, 2016, 8 pages.
"Non-Final Office Action", U.S. Appl. No. 15/247,444, Oct. 15, 2018, 8 pages.
"Non-Final Office Action", U.S. Appl. No. 15/247,444, Nov. 17, 2017, 12 pages.
"Notice of Allowance", U.S. Appl. No. 15/247,444, Mar. 26, 2019, 7 pages.
"Softbinder / Soft Tie SRT260-11", https://www.hellermanntyton.com/shared/datasheets/CAD_141854.pdf, Apr. 20, 2010, 1 page.
"Advisory Action", U.S. Appl. No. 15/094,713, Feb. 22, 2018, 3 pages.
"Advisory Action", U.S. Appl. No. 15/094,713, Mar. 6, 2020, 3 pages.
"Advisory Action", U.S. Appl. No. 10/835,864, May 5, 2006, 3 pages.
"Advisory Action", U.S. Appl. No. 10/835,864, Aug. 30, 2007, 3 pages.
"European Search Report", EP Application No. 18200778.1, Feb. 6, 2019.
"Extended European Search Report", EP Application No. 19199457.3, Jul. 27, 2020, 11 pages.
"Extended European Search Report", EP Application No. 17154684.9, Jun. 22, 2017, 8 pages.
"Extended European Search Report", EP Application No. 17164002.2, Sep. 5, 2017, 8 pages.
"Final Office Action", U.S. Appl. No. 15/094,713, Jan. 30, 2017, 11 pages.
"Final Office Action", U.S. Appl. No. 10/835,864, May 31, 2007, 11 pages.
"Final Office Action", U.S. Appl. No. 17/658,730, Dec. 27, 2022, 11 pages.
"Final Office Action", U.S. Appl. No. 13/220,308, Dec. 11, 2013, 12 pages.
"Final Office Action", U.S. Appl. No. 15/094,713, Nov. 30, 2017, 13 pages.
"Final Office Action", U.S. Appl. No. 15/094,713, Feb. 6, 2020, 26 pages.
"Final Office Action", U.S. Appl. No. 10/835,864, Mar. 24, 2006, 8 pages.
"Final Office Action", U.S. Appl. No. 11/191,654, Oct. 9, 2007, 9 pages.
"Final Office Action", U.S. Appl. No. 11/580,363, Oct. 16, 2009, 9 pages.
"Foreign Office Action", CN Application No. 201910924869.8, Sep. 9, 2021, 10 pages.
"Foreign Office Action", CN Application No. 201710229338.8, Oct. 8, 2018, 12 page.
"Foreign Office Action", CN Application No. 201710066210.4, Jan. 21, 2020, 13 pages.
"Foreign Office Action", CN Application No. 201910924869.8, Jun. 15, 2021, 13 pages.
"Foreign Office Action", CN Application No. 201710229388.8, Dec. 20, 2019, 15 pages.
"Foreign Office Action", CN Application No. 201710229388.8, Jun. 24, 2019, 16 pages.
"Foreign Office Action", KR Application No. 10-2019-0117178, Sep. 1, 2020, 16 pages.
"Foreign Office Action", CN Application No. 202011230192.7, Oct. 13, 2022, 17 pages.
"Foreign Office Action", CN Application No. 201910924869.8, Dec. 25, 2020, 21 pages.
"Foreign Office Action", JP Application No. 2019-164417, Apr. 15, 2021, 4 pages.
"Foreign Office Action", EP Application No. 17164002.2, Aug. 16, 2018, 4 pages.
"Foreign Office Action", EP Application No. 19199457.3, Dec. 3, 2020, 4 pages.
"Foreign Office Action", CN Application No. 201710229388.8, Jul. 1, 2020, 8 pages.
"Foreign Office Action", JP Application No. 2019-164417, Oct. 6, 2020, 8 pages.
"Foreign Office Action", CN Application No. 202011230192.7, Jun. 14, 2022, 9 pages.
"Non-Final Office Action", U.S. Appl. No. 15/423,419, Jan. 11, 2018, 10 pages.
"Non-Final Office Action", U.S. Appl. No. 17/136,945, Sep. 15, 2021, 10 pages.
"Non-Final Office Action", U.S. Appl. No. 13/220,308, Feb. 14, 2014, 12 pages.
"Non-Final Office Action", U.S. Appl. No. 15/094,713, May 30, 2017, 12 pages.
"Non-Final Office Action", U.S. Appl. No. 13/738,567, Mar. 27, 2015, 13 pages.
"Non-Final Office Action", U.S. Appl. No. 17/658,730, Sep. 13, 2022, 13 pages.
"Non-Final Office Action", U.S. Appl. No. 15/094,713, Jun. 22, 2016, 17 pages.
"Non-Final Office Action", U.S. Appl. No. 16/510,065, Aug. 29, 2019, 20 pages.
"Non-Final Office Action", U.S. Appl. No. 15/094,713, Feb. 14, 2019, 26 pages.
"Non-Final Office Action", U.S. Appl. No. 16/147,668, May 13, 2020, 5 pages.
"Non-Final Office Action", U.S. Appl. No. 10/835,864, Aug. 25, 2006, 6 pages.
"Non-Final Office Action", U.S. Appl. No. 12/221,632, Nov. 27, 2009, 6 pages.
"Non-Final Office Action", U.S. Appl. No. 13/220,308, Jun. 20, 2013, 7 pages.
"Non-Final Office Action", U.S. Appl. No. 13/738,567, Oct. 8, 2015, 7 pages.
"Non-Final Office Action", U.S. Appl. No. 10/835,864, Oct. 6, 2005, 8 pages.
"Non-Final Office Action", U.S. Appl. No. 11/580,363, Dec. 22, 2008, 8 pages.
"Non-Final Office Action", U.S. Appl. No. 11/191,654, Jun. 9, 2006, 9 pages.
"Notice of Allowance", U.S. Appl. No. 16/147,668, Jul. 2, 2018, 10 pages.
"Notice of Allowance", U.S. Appl. No. 17/136,945, Mar. 3, 2022, 5 pages.
"Notice of Allowance", U.S. Appl. No. 10/835,864, May 27, 2011, 5 pages.
"Notice of Allowance", U.S. Appl. No. 16/147,668, Sep. 17, 2020, 5 Pages.
"Notice of Allowance", U.S. Appl. No. 12/221,632, Mar. 30, 2010, 6 pages.
"Notice of Allowance", U.S. Appl. No. 17/658,730, Mar. 2, 2023, 7 pages.
"Notice of Allowance", U.S. Appl. No. 11/580,363 IDS, Mar. 29, 2010, 7 pages.
"Notice of Allowance", U.S. Appl. No. 11/191,654, Jul. 10, 2008, 7 pages.

(56) References Cited

OTHER PUBLICATIONS

"Partial European Search Report", EP Application No. 19199457.3, Feb. 5, 2020, 12 pages.
"Restriction Requirement", U.S. Appl. No. 12/221,632, Jul. 7, 2009, 5 pages.
"Restriction Requirement", U.S. Appl. No. 16/147,668, Feb. 18, 2020, 6 pages.
"Restriction Requirement", U.S. Appl. No. 11/580,363, Oct. 2, 2008, 6 pages.
"Restriction Requirement", U.S. Appl. No. 15/423,419, Dec. 13, 2017, 7 pages.
"Solar Energy—Reliable Cable Management Solutions for Solar Plants", Retrieved at: https://www.hellermanntyton.com/shared/datasheets/1820602.pdf—on Mar. 15, 2023, 37 pages.
Cab Solar, "Torque Tube Hangers Quick and Easy Under Panel Cable Management", https://www.cabproducts.com/wp-content/uploads/2022/08/CAB-Solar-Tube-Hangers-SalesSheet5-AUG2022A.pdf, Aug. 2022, 2 pages.
"Extended European Search Report", EP Application No. 2318950.9, Nov. 23, 2023, 8 pages.
"IMI Checkpoint", Retrieved at: http://www.imiproducts.com/products/checkpoint/—on Jan. 16, 2017, 2 pages.
"Non-Final Office Action", U.S. Appl. No. 15/406,941, Sep. 5, 2017, 7 pages.
"Notice of Allowance", U.S. Appl. No. 15/406,941, Jan. 24, 2018, 5 pages.
"Restriction Requirement", U.S. Appl. No. 18/125,321, Nov. 26, 2024, 6 pages.
"Ex Parte Quayle", U.S. Appl. No. 18/125,321, filed Feb. 27, 2025, 6 pages.
"Foreign Office Action", KR Application No. 10-2023-0082314, Mar. 31, 2025, 22 pages.
"Notice of Allowance", U.S. Appl. No. 18/125,321, filed Apr. 25, 2025, 9 pages.

\* cited by examiner

ANTI-WOBBLE FIR TREE MOUNT

INCORPORATION BY REFERENCE

This application claims priority to U.S. Provisional Application No. 63/367,461, filed Jun. 30, 2022, the disclosure of which is incorporated by reference in its entirety.

BACKGROUND

An example fir tree mount includes a resilient mounting section with a mounting stud and plurality of flexible branches extending outwardly from the mounting stud (e.g., core). The branches (e.g., ribs, fins) are configured for deforming (flexing) predominantly in a direction parallel to the direction of insertion of the mounting stud into the mounting aperture. In some cases, a first portion of the branches may entirely pass through the mounting aperture and spring back to engage a backside of the supporting structure to retain the fir tree mount in the aperture, while a second portion of the branches remains in a flexed position within the aperture, providing for lateral support of the mounting section in the aperture. The fir tree mount may include an object support that is configured to attach to the component.

As a result of severe impacts (e.g., jostling, bouncing, vibrations) that may occur during some use cases, the lateral support provided by the second portion of branches may be limited, and a gap between the mounting stud and the distal ends of the second portion of branches may permit for movement of the mounting stud within the aperture. This movement may include one or more of side-to-side movement, rocking movement, and/or tilting movement (collectively "lateral movement") and may result in the fir tree mount moving from a mounted position to a shifted position. In the mounted position, the mounting stud may be centered relative to the axis of the mounting aperture. In the shifted position the mounting stud may be closer or farther from the distal ends of the second portion of branches. The change from a mounted position to a shifted position is undesirable, because the lateral movement of the fir tree mount may result in a change to the position of the component attached to the fir tree mount (e.g., a change to the location of an elongate article attached to the fir tree mount), potentially resulting in a source of noise and/or damage to the attached component.

SUMMARY

This document describes anti-wobble fir tree mounts for attaching a component to a supporting structure. In aspects, an anti-wobble fir tree mount is configured for reducing the lateral movement of the anti-wobble fir tree mount during use.

In one general aspect, disclosed is an apparatus that may include a body section, the body section configured for positioning adjacent to a first side of a supporting structure, the body section having a bottom portion. The apparatus may also include a mounting section, the mounting section extending from the bottom portion of the body section, the mounting section configured for insertion into a mounting aperture defined in the supporting structure first side, the mounting section having: a mounting stud; a first branch extending from the mounting stud; a second branch extending from the mounting stud, the second branch spaced apart from the first branch, the first branch positioned between the body section and the second branch, the first branch and the second branch configured for deflection in a direction of the body section upon insertion of the mounting section into the mounting aperture, the second branch may include an upper side facing the body section, the first branch may include: a lower side, the lower side facing the upper side of the second branch; and a flange member extending from the lower side, the flange member configured for contacting the upper side of the second branch during insertion of the mounting section into the mounting aperture to limit a deflection of the second branch in the direction of the body section.

This Summary is provided to introduce simplified concepts of anti-wobble fir tree mounts, which are further described below in the Detailed Description and are illustrated in the Drawings. This Summary is not intended to identify essential features of the claimed subject matter, nor is it intended for use in determining the scope of the claimed subject matter.

BRIEF DESCRIPTION OF THE DRAWINGS

The details of one or more aspects of anti-wobble fir tree mounts are described with reference to the following Drawings, in which the use of the same numbers in different instances may indicate like features and/or components.

DETAILED DESCRIPTION

Overview

This document describes anti-wobble fir tree mounts for attaching a component to a supporting structure. Aspects described in the present disclosure address technical problems associated with the lateral movement of installed fir tree mounts during use. By reducing the lateral movement of the fir tree mount, the position of an attached component relative to the supporting structure is maintained, which may eliminate a source of noise, protect the component from damage, and have other benefits.

In one example, a described anti-wobble fir tree mount includes a body section, the body section configured for positioning adjacent to a first side of a supporting structure, the body section having a bottom portion. The fir tree mount may also include a mounting section, the mounting section extending from the bottom portion of the body section, the mounting section configured for insertion into a mounting aperture defined in the supporting structure first side, the mounting section having: a mounting stud; a first branch extending from the mounting stud; a second branch extending from the mounting stud, the second branch spaced apart from the first branch, the first branch positioned between the body section and the second branch, the first branch and the second branch configured for deflection in a direction of the body section upon insertion of the mounting section into the mounting aperture, the second branch may include an upper side facing the body section, the first branch may include: a lower side, the lower side facing the upper side of the second branch; and a flange member extending from the lower side, the flange member configured for contacting the upper side of the second branch during insertion of the mounting section into the mounting aperture to limit a deflection of the second branch in the direction of the body section.

This is but one example of how the described anti-wobble fir tree mounts may be used to address technical problems associated with the lateral movement of installed fir tree mounts. Other examples and implementations are described throughout this document.

Example Environment

Figure 1:
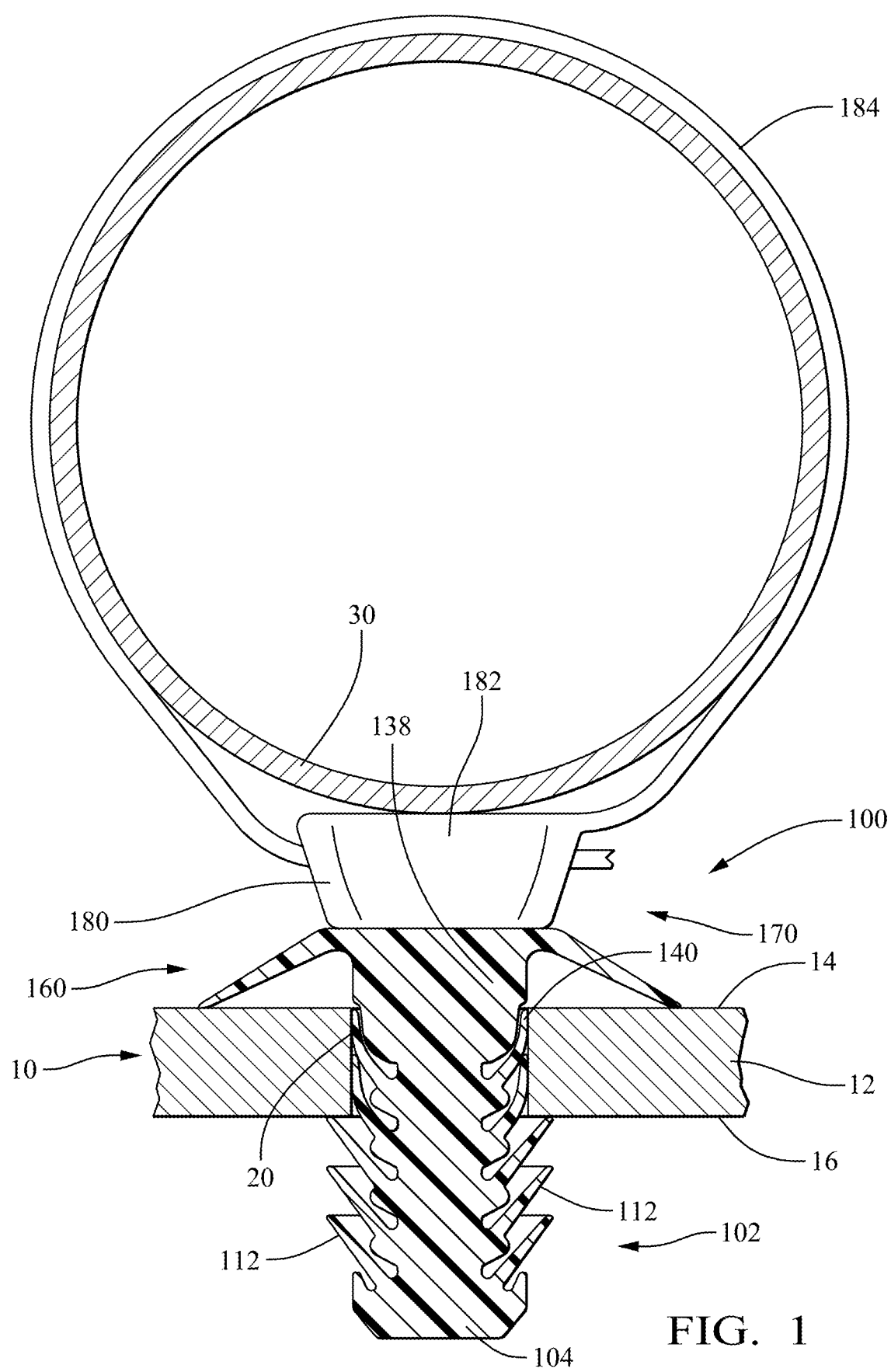
FIG. 1 is a cross-sectional view of an aspect of an anti-wobble fir tree mount installed in an aperture of a supporting structure.

In aspects, a described anti-wobble fir tree mount is configured to attach a component to a supporting structure at a mounting aperture defined in the supporting structure. Illustrated in FIG. 1 is an environmental, cross-sectional view of an aspect of an anti-wobble fir tree mount 100 (fir tree mount 100). The environment illustrated in FIG. 1 includes a supporting structure 10 onto which an anti-wobble fir tree mount 100 may be attached, for example, at a mounting aperture 20 defined in the supporting structure 10. The supporting structure 10 may include one or more of a panel (e.g., door panel, trunk panel, wheel housing panel, dash panel), machine frame, machine rail, vehicle frame, vehicle chassis, sill plate, object surface, and the like.

In FIG. 1, the supporting structure 10 illustrated is a panel 12. The panel 12 has a first side 14 opposite a second side 16. The mounting aperture 20 extends from the first side 14 to the second side 16 and defines a panel thickness therebetween. In aspects, the mounting aperture 20 is circular, ovular, rectilinear, or another shape.

The anti-wobble fir tree mount 100 includes a mounting section 102 and a body section 160. The mounting section 102 has a mounting stud 104 configured for mounting the fir tree mount 100 on the supporting structure 10. The mounting section 102 further includes a plurality of branches 112 extending outwardly from the mounting stud 104. In aspects, the mounting stud 104 includes a cap portion 138 configured for receiving a portion of a nesting branch 140 (e.g., an uppermost branch, a last engaging branch) of the mounting stud 104.

The fir tree mount 100 may further attach to a component, such as component 30 illustrated in FIG. 1. A component may include one or more of a channel, panel, elongate article (e.g., wire, cable, hose, tubing, pipe, fiber optic cable, conduit, wire harness assembly), and the like. Two or more components may be bundled together into a bundle. In FIG. 1, the component 30 is a pipe. The attachment to the component 30 may be through a connector section 170 that may include an object support 180 configured for supporting an object, such as a component 30. In FIG. 1, the object support 180 is a cable tie mount having a head 182 configured for receiving an elongate strap 184. In other aspects, different forms of connector sections 170 and/or object supports 180 may be utilized, as described below. In aspects, a fir tree mount 100 may not include a connector section and/or an object support.

Example Apparatuses

The anti-wobble fir tree mount 100 is further illustrated in FIGS. 2-8 without the connector section 170 illustrated, for simplification. The anti-wobble fir tree mount 100 includes a mounting section 102 and a body section 160. The mounting section 102 has a mounting stud 104 configured for mounting the fir tree mount 100 on the supporting structure 10. For example, the fir tree mount 100 is configured to enable an installer to exert a push-in force (e.g., an insertion force) on the fir tree mount 100 to insert the mounting stud 104 into the mounting aperture 20 to install the fir tree mount 100 on the supporting structure 10. In aspects, clearance may exist between the branches and the flange member during the insertion of the mounting stud into the mounting aperture, allowing the fir tree mount to maintain low push-in force. The retention strength of the fir tree mount in the mounting aperture, and the retention strength during pull-out, may be maintained (e.g., does not decrease) across a mounting aperture range. The flange member may provide branch support during pull-out and a flange member may physically contact one or more adjoining branch during pull-out. In aspects, the flange member does not affect or increase the insertion force for inserting the mounting stud into the mounting aperture.

Figure 2:
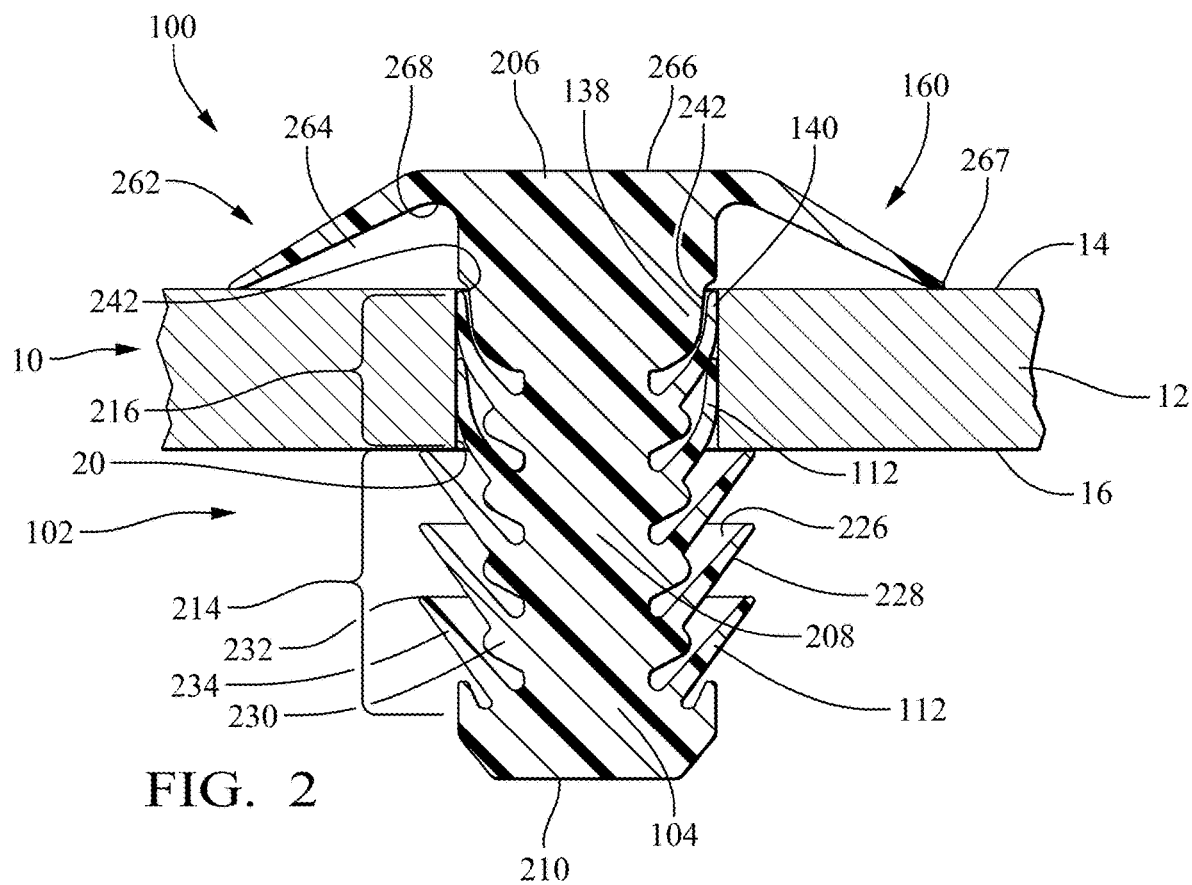
FIG. 2 is a partial view of the aspect of FIG. 1.

The mounting section 102 includes the mounting stud 104 and plurality of branches 112 extending outwardly from the mounting stud 104. The branches 112 may be flexible branches configured for deforming (flexing) predominantly in a direction parallel to a direction of insertion (longitudinal insertion) of the mounting stud 104 into the mounting aperture 20 through the first side 14 of the supporting structure 10, as illustrated in FIGS. 1 and 2. In cases, a first portion 214 of the branches 112 may entirely pass through the mounting aperture 20 and spring back to engage a second side 16 of the supporting structure 10 to retain the fir tree mount 100 in the mounting aperture 20, while a second portion 216 of the branches 112 remain in a flexed position within the mounting aperture 20, providing for lateral support of the mounting stud 104 in the mounting aperture 20. In this way, the branches 112 of the fir tree mount 100 engage the mounting aperture 20, resulting in a pull-out force that resists the withdrawal of the mounting stud 104 from the mounting aperture 20. In aspects, the flange member increases the pull-out force when removing the fir tree mount 100 from mounting aperture 20 across the range of capable mounting aperture sizes (e.g., mounting aperture diameter tolerance ranges).

The mounting section 102 may be elongated and may be circular, oval, or another shape. The mounting sections illustrated in FIGS. 1-9 are circular in shape; whereas in other aspects the mounting section may be oval in shape (e.g., FIG. 10). The mounting stud 104 includes a base 206 that attaches to the body section 160, an end 210, and a center section 208 located between the base 206 and the end 210. The end 210 is configured for insertion into the mounting aperture 20 through the first side 14 of the supporting structure 10, as illustrated in FIGS. 1 and 2.

Figure 3:
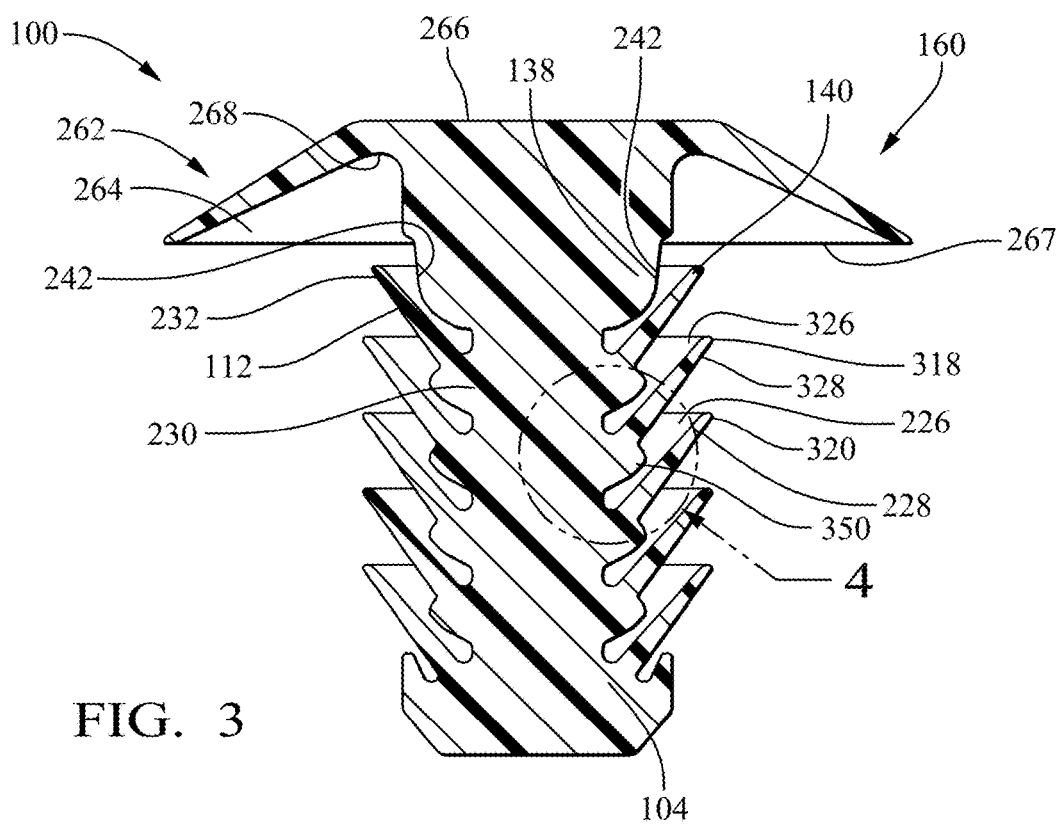
FIG. 3 is a cross-sectional view of the anti-wobble fir tree mount of FIG. 2, along line 3-3 in FIG. 7.

The branches 112 extend outwardly from center section 208 of the mounting stud 104. The branches 112 may extend towards the body section 160, as illustrated in FIG. 3. The branches 112 (e.g., first branch 318, second branch 320) have an upper side (e.g., upper side 326 of first branch 318, upper side 226 of second branch 320) and a lower side (e.g., lower side 328 of first branch 318, lower side 228 of second branch 320). The use of "upper" and "lower" herein refers to the position of a side of a branch relative to the body section 160, where an upper (first) side faces the body section 160 and a lower (second) side faces away from the body section 160. In aspects, an upper (first) side may face away from the body section and a lower (second) side may face the body section.

Figure 4A:
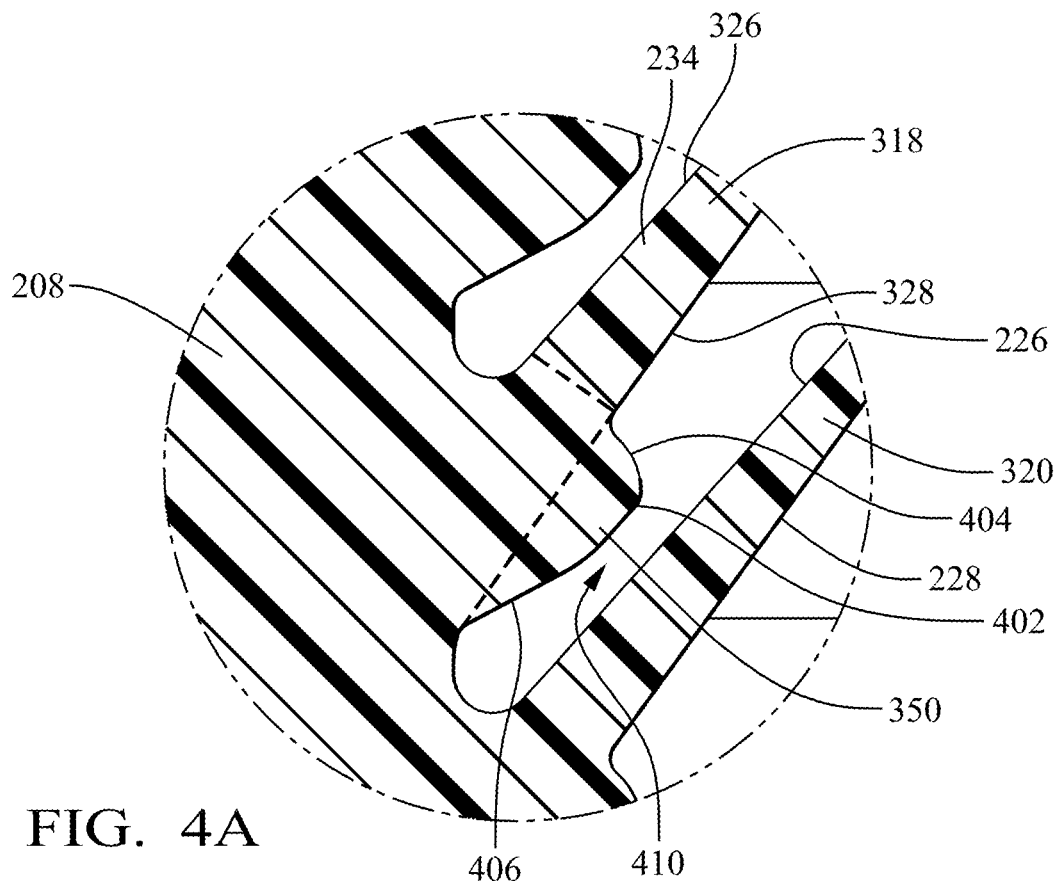
FIG. 4A is a partial view of the anti-wobble fir tree mount of FIG. 3.

The branches 112 have a root 230 that connects with the mounting stud 104 and an end 232 that is spaced apart from the root 230, with a fin portion 234 defined therebetween, as illustrated in FIG. 4A. A branch 112 may taper from the root 230 to the end 232. The end 232 may be sized to fit and engage a root diameter of a cut thread profile of mounting aperture that includes a threaded bore.

Figure 5:
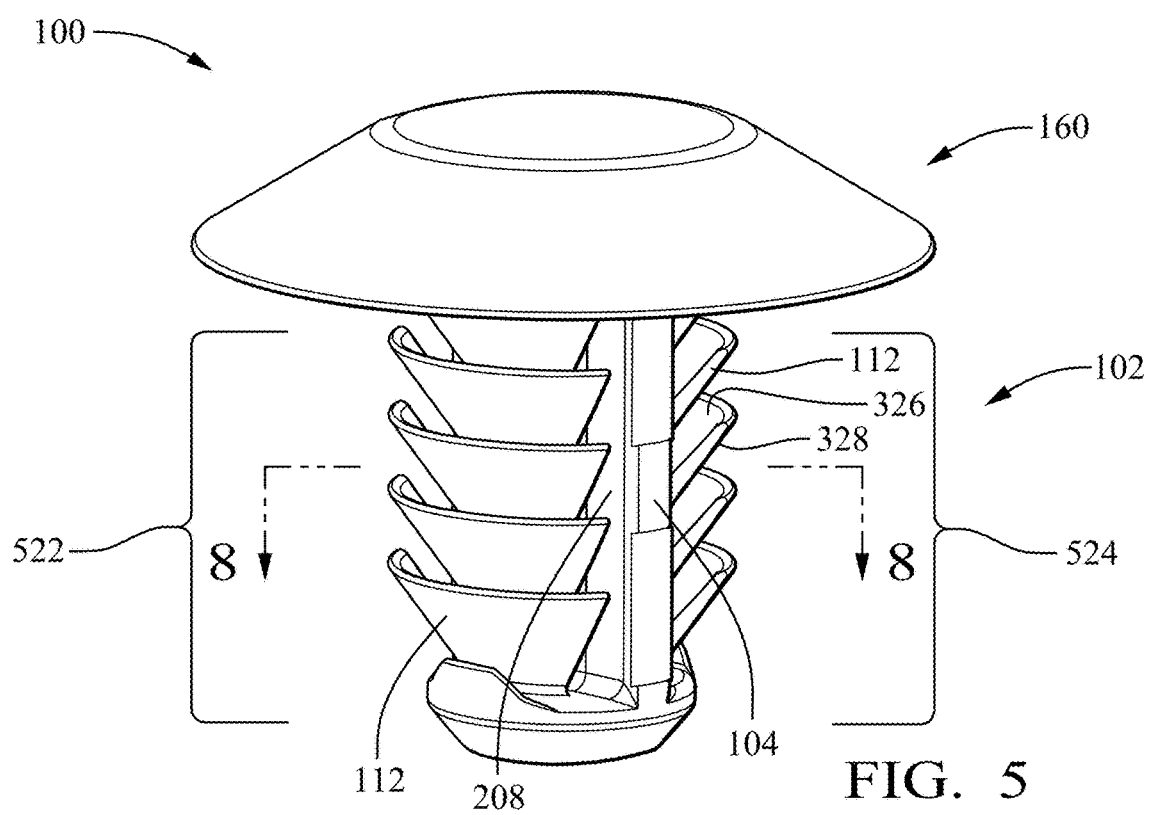
FIG. 5 is an upper, perspective view of the anti-wobble fir tree mount of FIG. 3.

The branches 112 may be arranged in rows of branches axially spaced apart along the longitudinal axis of the mounting stud 104 or a portion thereof. For example, as illustrated in FIG. 5, a first array 522 of branches 112 extending along a first peripheral region of the mounting stud 104 and/or a second array 524 of branches 112 extending along a second peripheral region of the mounting stud 104. In aspects, the branches 112 extend from the center section 208 at an acute angle (e.g., toward the body section 160). The branches and/or arrays of branches may be arranged in an annular fashion (e.g., extending fully around the mounting stud, extending partially around the mounting stud), in a radial fashion, and the like. In aspects, such as the aspect illustrated in FIG. 10 (described below), the branches 1012 may be configured in an axially offset or helical thread pattern. For example, a first array 1022 of branches 1012 may be axially spaced, along the longitudinal axis of the mounting stud 1004, and spaced apart from a second array 1024 of branches 1012, thereby defining a helical thread pattern.

In the aspects illustrated in FIGS. 3 and 4A, the branches 112 of the mounting section 102 include a first branch 318 and a second branch 320. In aspects, one or more of the branches 112 may include a flange member 350, located on one or both of the upper (first) side or the lower (second) side. In FIGS. 3 and 4A, the first branch 318 includes a flange member 350, which extends from the lower side 328 of the first branch 318 and is defined on the underside of the branch. In aspects, the flange member 350 is located on the fin portion 234 of a branch 112 and may be spaced apart from the root 230 and the end 232. The flange member 350 faces an opposing surface (e.g., the upper side 226) of the second branch 320. The flange member 350 is configured to provide a fulcrum (e.g., fixed hinge) against which an adjacent branch can pivot (flex). For example, in FIGS. 3 and 4A, the first branch 318 includes a flange member 350, which provides a fulcrum against which the second branch 320 can pivot.

In aspects, the inclusion of a flange member 350 does not increase the push-in force, but may limit the deflection of the branches 112, thereby permitting passage into the mounting aperture 20. When so inserted, the flange member 350 may fill gaps between the branches 112 and the mounting stud 104 and minimize lateral movement of the fir tree mount 100 in the mounting aperture 20. The flange member 350 may reduce the clearance between the branches 112 at the point of contact within the mounting aperture 20 geometry.

The flange member 350 illustrated in FIGS. 3 and 4A includes a flat portion 402. A flat portion 402 may define a plane that is generally perpendicular to at least one of a plane of the upper side 226 of the second branch 320 or a plane of the lower side 328 of the first branch 318. In aspects, the flat portion 402 extends between an outer ramp portion 404 and an inner ramp portion 406. At least one of the outer ramp portion 404 or the inner ramp portion 406 extend away from the branch 112 (e.g., the lower side 328 of the first branch 318). In the aspect illustrated in FIG. 4A, the outer ramp portion 404 has a steeper pitch than the inner ramp portion 406 relative to the lower side 328 of the first branch 318. In other aspects, an inner ramp portion may have a steeper pitch than an outer ramp portion or both ramp portions may have the same pitch. The flat portion may be spaced apart from the lower side of the first branch. The inclusion of a flat portion 402 may add more steel and strength to the gap 410 located between the upper side 226 of the second branch 320 and the flat portion 402 of the flange member 350 in the mold. In this way, the steel conditions in the mold are improved, potentially increasing the life of the mold.

Figure 4B:
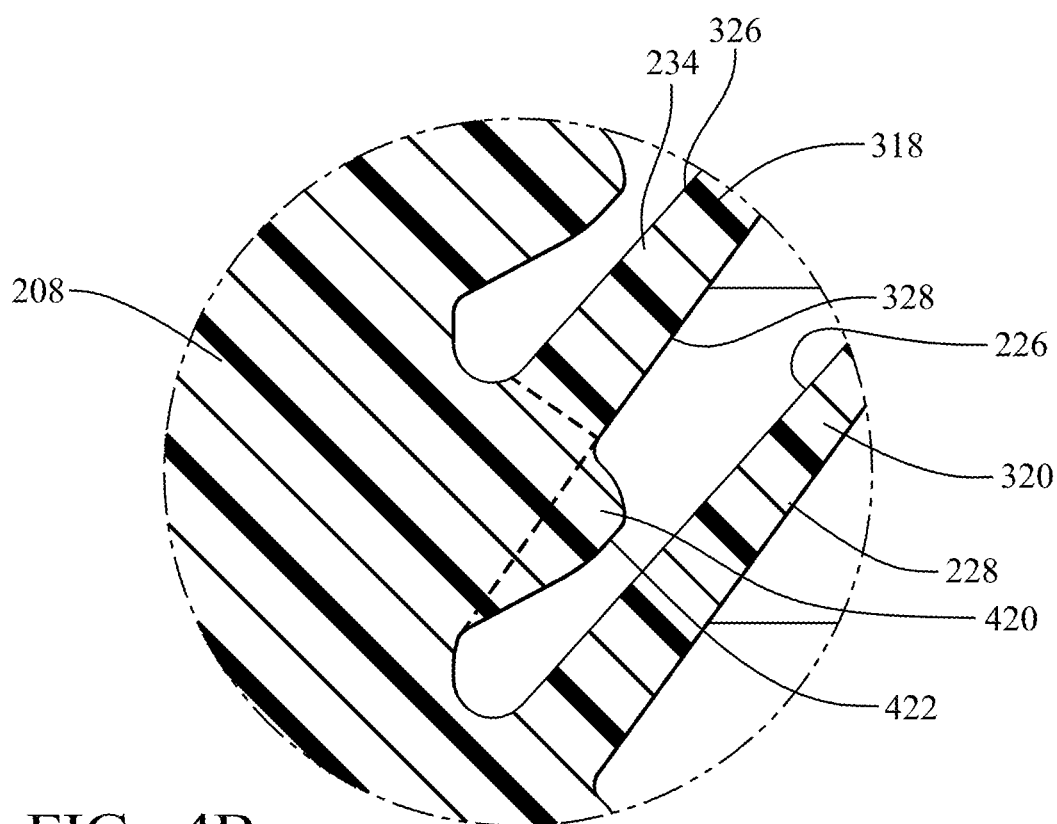
FIG. 4B is a partial view of another example anti-wobble fir tree mount.
Figure 4C:
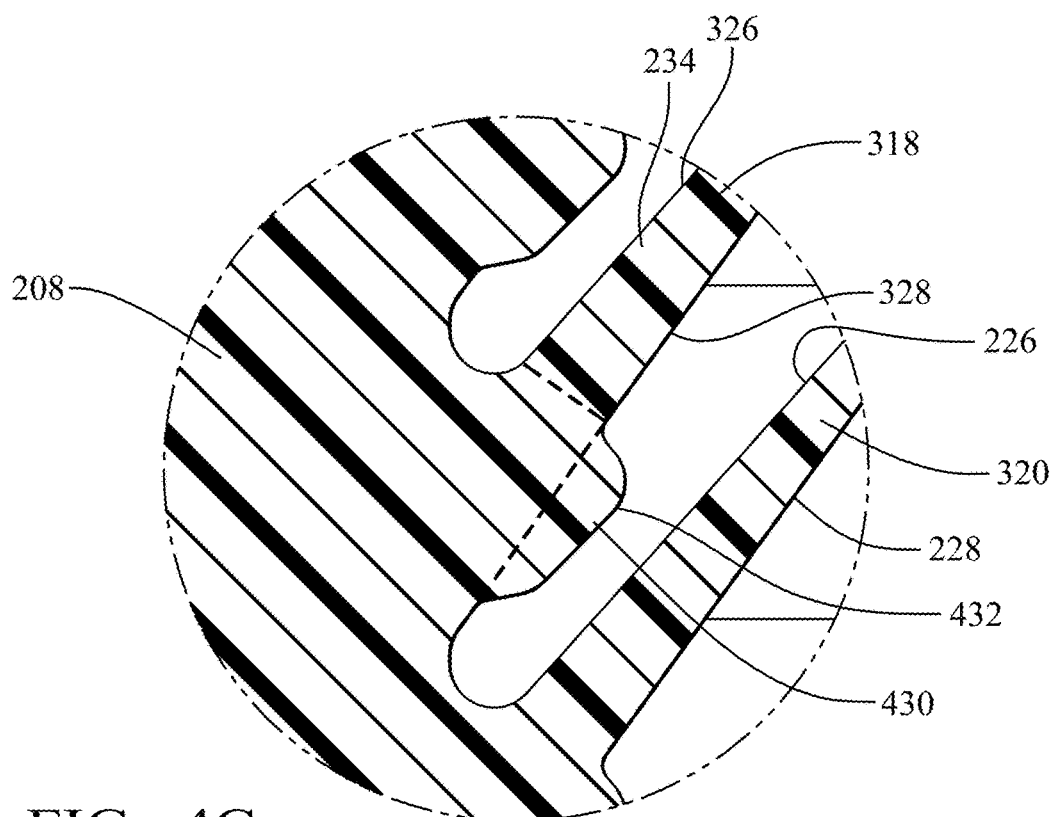
FIG. 4C is a partial view of a further example anti-wobble fir tree mount.

In the aspect illustrated in FIG. 4A, the flange member 350 has a cross-sectional shape that includes a conic portion represented by the inner ramp portion 406, a cylindrical portion represented by the flat portion 402, and a semi-ellipsoidal portion represented by the outer ramp portion 404. In aspects, a flange member may include one or more of no flat portion, a short flat portion, or a long flat portion. FIG. 4B illustrates another aspect of a flange member 420 with a short flat portion 422, where the flange member 420 has a more of tear drop or wedge cross-sectional shape. FIG. 4C illustrates an aspect of a flange member 430 with a long flat portion 432, where the flange member 430 has a more rectangular or ovular cross-sectional shape.

In this way, the flange member 350 is configured to limit the deflection of one or more adjacent branches when the branches 112 are compressed inward during the insertion into the mounting aperture 20. For example, the flange member 350 illustrated on the lower side 328 of the first branch 318 is configured to limit the deflection of the second branch 320 when the branches 112 deflect during the insertion of the branches 112 into the mounting aperture 20, as illustrated in FIG. 2.

When compressed towards the mounting stud 104, a gap is defined between an inner side (e.g., the upper side 226) of the branch 112 and the mounting stud 104, as illustrated in FIG. 2. The presence of the flange member 350 results in a reduction and/or removal of the gap, resulting in a tighter fit of the fir tree mount 100 in the mounting aperture 20. In aspects, this results in less lateral movement of the mounting stud 104 in the mounting aperture 20 when the branches are compressed inwardly, without increasing the push-in force, while increasing the pull-out force required to pull the mounting stud 104 out of the mounting aperture 20.

A flange member 350 may be a bulb, bulge, ridge, distended portion, compression limiter, deflection limiter, pivot member, or the like, which is defined on at least one side of a branch 112 (e.g., the upper side 226, the lower side 228, the upper side 326, the lower side 328, both the upper and lower sides). While the outer shape of the flange member 350 illustrated in FIGS. 3 and 4A is curved, in other aspects the outer shape of a flange member may be another shape.

The flange member 350 may be located anywhere on the lower side (e.g., lower side 228, lower side 328) or upper side (e.g., upper side 226, upper side 326) of a branch 112 (e.g., first branch 318, second branch 320). In the aspect illustrated in FIG. 4A, the flange member 350 is defined on the lower side 328 of the first branch 318. In aspects, such as is illustrated in FIG. 4A, the flange member may be positioned based on the flex point of the branch by determining the tangency for a flat portion (e.g., flat portion 420) on the upper branch, taking a perpendicular line from the tangency, and using that point to define the starting flex point of the branch. Once the starting flex point of the branch 112 is determined (e.g., right in the middle of the radius), a starting point of the flange member 350 may be positioned at or adjacent to that location. In aspects, a flange member may be positioned nearer to the end of the branch or nearer to the root of the branch than what is illustrated in FIGS. 3 and 4A-4C. In aspects, such as FIGS. 1-10, the branch proximate to the end of the mounting stud may not include a flange member.

Figure 6:
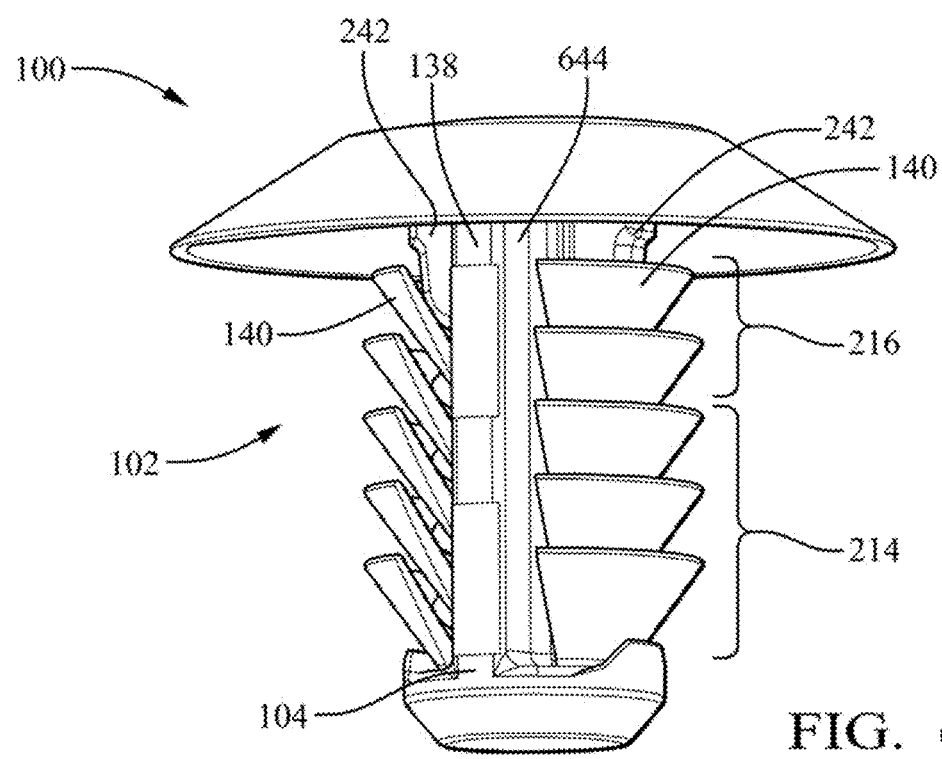
FIG. 6 is a lower, perspective view of the anti-wobble fir tree mount of FIG. 3.

In aspects, the mounting stud 104 includes a cap portion 138 configured for receiving a portion of a nesting branch 140 (e.g., an uppermost branch, a last engaging branch) of the mounting stud 104. As illustrated in FIGS. 2, 3, and 6, the cap portion 138 may include one or more axially extending flanges 242 extending from an outside surface 644 (illustrated in FIG. 6) of the mounting stud 104 that are shaped to receive a portion of the nesting branch 140. In this way, the cap portion 138 allows the nesting branch 140 to deflect against (during mounting stud 104 insertion into the mounting aperture 20) and nest within the cap portion 138 (as illustrated in FIGS. 1 and 2). This allows the nesting branch 140 to rotate and compress, providing for less fir tree movement (when installed) without increasing push-in force. In this way, the cap portion 138 reduces the gap defined between an inner side (e.g., upper side 226, upper side 326) of a branch 112 and the mounting stud 104. In aspects, one or more of the branches 112 (e.g., the nesting branch 140) may be shorter than one or more of the other branches. In such a configuration, the shorter length of a nesting branch 140 may enable better engagement with the mounting aperture 20 of a panel 12 having a thin panel thickness. A fir tree mount 100 may include at least one of a cap portion 138 or the flange member 350 (described above).

A fir tree mount 100 may further include a body section 160 configured to contact the first side 14 of the supporting structure 10, limit the longitudinal insertion of the mounting section 102 into the mounting aperture 20, and thereby prevent the fir tree mount 100 from being pushed completely through the mounting aperture 20. As a result, the body section 160 may be configured for positioning adjacent to the first side 14 of the supporting structure 10 (e.g., panel 12).

In aspects, the body section 160 includes a spring section 262 that includes a stabilizer (e.g., diaphragm spring 264, winged stabilizer, spring-less stabilizer) having a first end 266, a second end 267, and a bottom portion 268. The second end 267 is configured for engaging the first side 14 of the supporting structure 10, as illustrated in FIG. 2. The spring section 262 is configured to contact the first side 14 of the supporting structure 10 to limit the longitudinal insertion of the mounting section 102 into the mounting aperture 20. As described below, a body section 160 may support a connector section 170 configured for connecting with an object support, as illustrated in FIG. 1. In aspects, a diaphragm spring is a spring that when compressed during insertion, on the first side supporting structure, forces a set of branches (e.g., offset axially (staggered) branches, non-staggered branches) below the second side of the supporting structure surface to engage the surface below the supporting structure. After insertion of the mounting section (e.g., fir tree), an amount of branch compression will occur, below the supporting structure surface, along with an amount of diaphragm compression will remain; thereby suspending the fir tree mount between the compressed elements and the supporting structure surfaces. The function of the compressed diaphragm may be to adjust a set of engaging branches to all the different panel thickness within a defined thickness range. Without a diaphragm, and/or without compressing the diaphragm, the inserted/mounted fir tree mount may be able to migrate along the axis (perceived looseness along the axis) until engagement with a set of branches (e.g., offset axially (staggered) branches, non-staggered branches).

In aspects, a fir tree mount 100 also includes a connector section 170 that connects with the body section 160. The connector section 170 may include an object support 180 that is configured to attach to the component 30, for example, as illustrated in FIG. 1. An object support 180 may include one or more of a routing component, a clip, toothed clip, wire clip, cable clip, clamp, cable tie mounts, panel fasteners, tape bar, wire channel, saddle mounts, wire harness anchors, self-affixing clip fastener (e.g., connector clip, bundling clip, harness clip, ratchet P-clamp, C-clip, docking clip, tubing clip, pipe clip, edge clip, routing clip, push pin, ratchet clamps, locking clamps), and the like. The object support 180 may also include a moment arm or other structure configured to space an attached component 30 apart from the fir tree mount 100. As illustrated in FIG. 1, the connector section 170 includes an object support 180 that is a cable tie mount.

Figure 8:
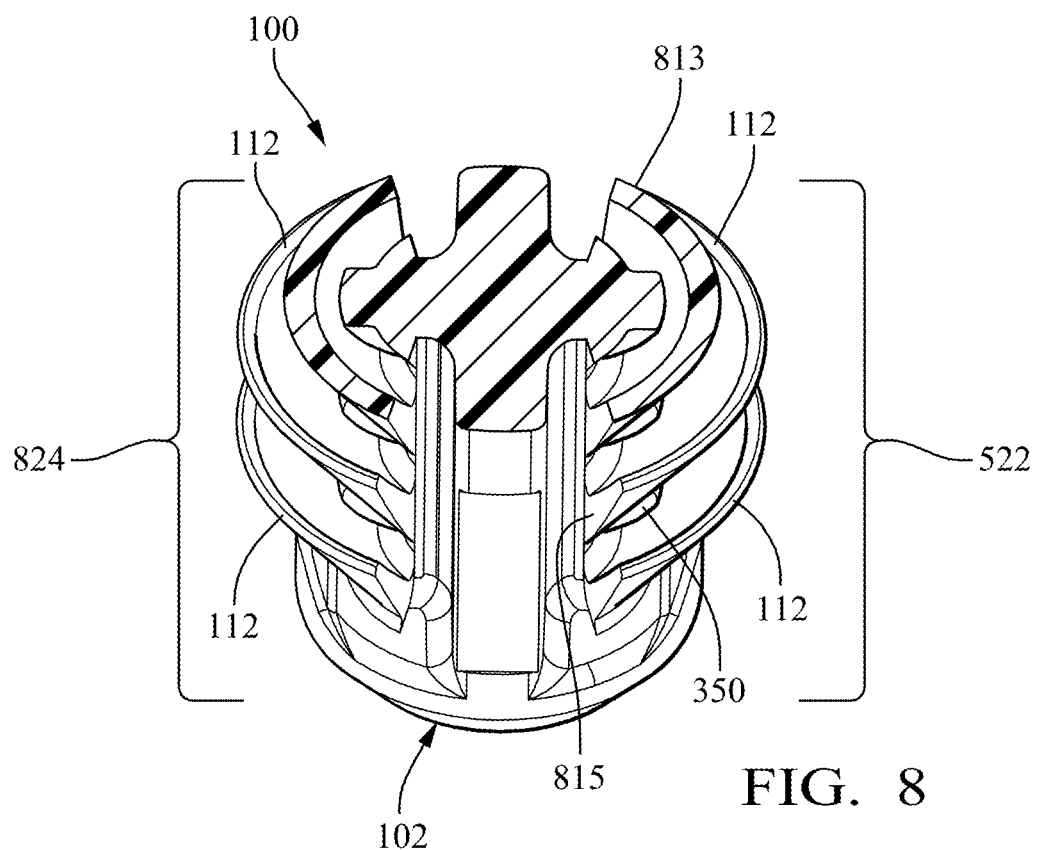
FIG. 8 is a partial, perspective view of the anti-wobble fir tree mount of FIG. 3, along line 8-8 in FIG. 5.

FIG. 8 illustrates a partial, perspective view of the anti-wobble fir tree mount 100 having a mounting section 102 with a plurality of branches 112. The branches 112 are arranged in two arrays (first array 522, second array 524). The branches 112 extend from a first end 813 to a second end 815.

Figure 7:
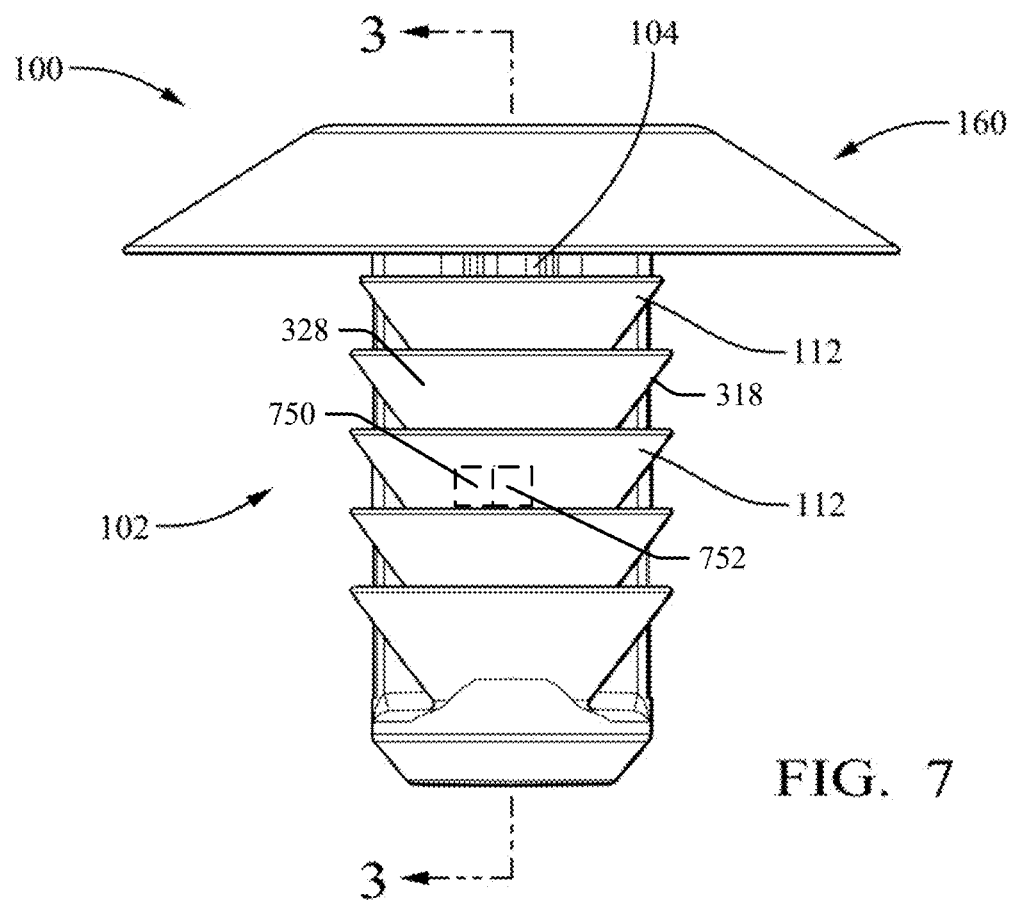
FIG. 7 is a side elevation view of the anti-wobble fir tree mount of FIG. 3.

At least one of the arrays (e.g., the first array 522) includes a flange member 350 that extends along a portion of the sweep of the branch 112 (e.g., a continuous segment extending along a portion of the sweep of the branch, multiple flange member segments extending intermittently along at least a portion of the sweep of the branch, multiple flange member segments extending intermittently along the full sweep of the branch). For example, FIG. 7 illustrates multiple flange member segments (750, 752) that extend along the lower side of the first branch 318.

Figure 9:
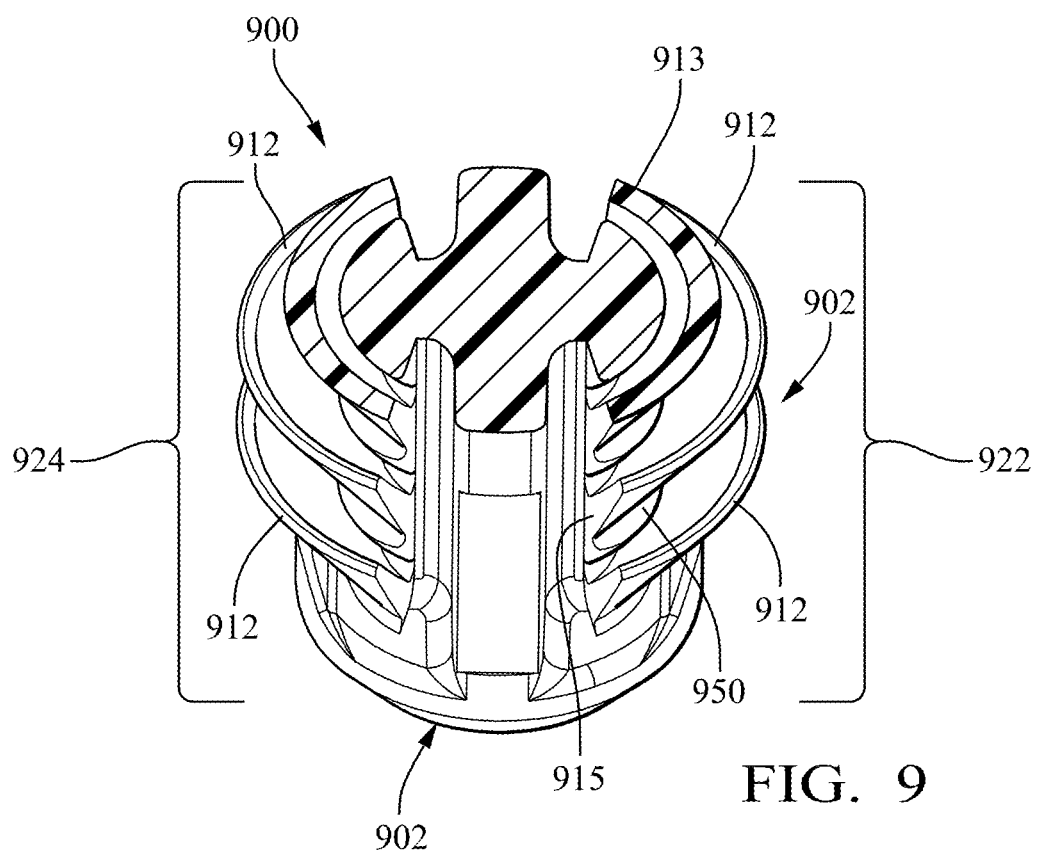
FIG. 9 is a partial, perspective view of an aspect of a second anti-wobble fir tree mount.

In another example, illustrated in FIG. 9 is an anti-wobble fir tree mount 900 having a mounting section 902 with a plurality of branches 912. The branches 912 are arranged in two arrays (first array 922, second array 924). The branches 912 extend from a first end 913 to a second end 915. At least one of the arrays (e.g., the first array 922) includes a flange member 950 (e.g., a single flange member segment) that extends along the full sweep of the branch 912, for example, as a continuous segment (e.g., an annular segment that extends annularly to a longitudinal axis of the mounting stud, an annular segment that extends annularly a limited distance to a longitudinal axis of the mounting stud). The anti-wobble fir tree mount 900 is illustrated without a connector section, for simplification.

In other aspects, an anti-wobble fir tree mount may attach to the component via the body section. For example, the fir tree mount may be a push pin fastener (e.g., plastic rivet) configured for attaching a component to a supporting structure through a mounting aperture defined in the supporting structure. In this aspect, the spring section of the body section holds the component (e.g., a trunk panel, a door panel, a wheel housing, a dash panel) to the supporting structure (e.g., a vehicle chassis, a vehicle frame).

Figure 10:
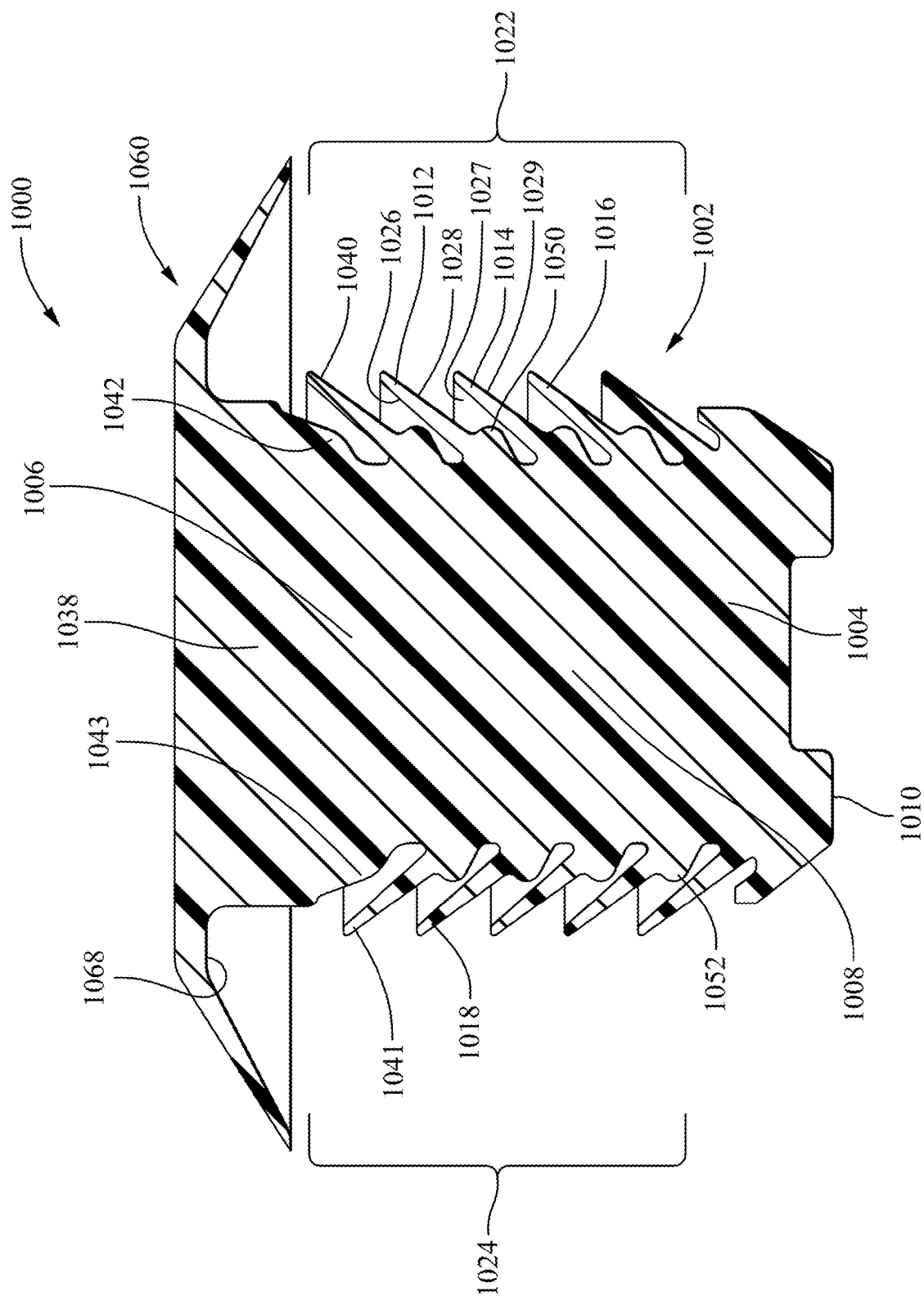
FIG. 10 is a cross-sectional view of a third anti-wobble fir tree mount.

Referring now to FIG. 10, another aspect of an anti-wobble fir tree mount 1000 is illustrated. The fir tree mount 1000 is similar to the fir tree mount 100 illustrated in FIGS.

1-8 and described above, except as detailed below. Thus, the fir tree mount 1000 includes a mounting section 1002, a mounting stud 1004, a base 1006, a center section 1008, an end 1010, a plurality of branches (e.g., first branch 1012, second branch 1014, third branch 1016, fourth branch 1018), a first array 1022, a second array 1024, a flange member (e.g., flange member 1050, flange member 1052), a body section 1060, and a bottom portion 1068. The branches may include upper sides and lower sides similar to the upper sides and lower sides illustrated in FIG. 3 and described above. In the aspect illustrated in FIG. 10, the first branch 1012 includes an upper side 1026 and a lower side 1028, and the second branch 1014 includes an upper side 1027 and a lower side 1029.

While in the aspect illustrated in FIG. 10, the flange member 1050 and flange member 1052 are illustrated as teardrop shaped in cross section, in other aspects the flange member may be another shape (e.g., a shape described above with respect to the flange member 350 illustrated in FIGS. 3 and 4A-4C). For example, as described with respect to the aspects illustrated in FIGS. 4A-4C, a flange member 1050, 1052 may include a flat portion located between an outer ramp portion and an inner ramp portion. The outer ramp portion may have a steeper pitch than the inner ramp portion relative to the lower side of the first branch. In other aspects, an inner ramp portion may have a steeper pitch than an outer ramp portion or both ramp portions may have the same pitch. The flat portion may be spaced apart from the lower side of the first branch. A flange member may have a cross-sectional shape that includes a conic portion represented by the inner ramp portion, a cylindrical portion represented by the flat portion, and a semi-ellipsoidal portion represented by the outer ramp portion. In aspects, a flange member may include one or more of no flat portion, a short flat portion, or a long flat portion.

The mounting section 1002 illustrated in FIG. 10 is oval in shape. The fir tree mount 1000 is illustrated without the connector section illustrated, for simplification. In the aspect illustrated in FIG. 10, the branches are configured in an offset or helical thread pattern. For example, the first array 1022 of branches may be axially spaced, along the longitudinal axis of the mounting stud 1004, and spaced apart from the second array 1024 of branches, thereby defining a helical thread pattern.

In aspects, the mounting stud 1004 includes a cap portion 1038 configured for receiving a portion of a nesting branch (e.g., nesting branch 1040, nesting branch 1041) of the mounting stud 1004. The cap portion 1038 may include one or more axially extending flanges (e.g., flange 1042, flange 1043) extending from an outside surface of the mounting stud 1004 that are shaped to receive a portion of a respective nesting branch. The cap portion 1038 allows the nesting branch to deflect against (during mounting stud 1004 insertion into the mounting aperture) and nest within the cap portion 1038. This allows the nesting branch (e.g., nesting branch 1040, nesting branch 1041) to rotate and compress, providing for less fir tree movement (when installed) without increasing push-in force. In this way, the cap portion 1038 reduces the gap defined between an inner side (e.g., an upper side) of a branch and the mounting stud 1004.

Materials

The components of an anti-wobble fir tree mount may be fabricated of any suitably resilient material, including polymeric material and metal. In aspects, the polymeric material may include one or more of polyamide, polyamide 6.6, nylon 6, nylon, polypropylene, and polyphenylene sulfide (PPS). One or more of the components of an anti-wobble fir tree mount may be formed of the same material as the other components, or a different material than the other components.

Example Systems/Assemblies

Also disclosed are systems and assemblies including one or more of an anti-wobble fir tree mount (described above), a component (described above), or a substrate (described above). For example, an automotive panel assembly including a fir tree mount (as described above) and a supporting structure having a mounting aperture defined therein, the fir tree mount including a mounting section and a body section. The fir tree mount is configured for attachment to the supporting structure at the mounting aperture defined in the supporting structure. The mounting section includes a mounting stud and plurality of flexible branches extending outwardly from the mounting stud.

The branches are configured for deforming (flexing) predominantly in a direction parallel to a direction of insertion of the mounting stud into the mounting aperture through a frontside of the supporting structure.

The branches include a first branch extending from the mounting stud and a second branch extending from the mounting stud. The second branch is spaced apart from the first branch. The first branch is positioned between the body section and the second branch. The first branch and the second branch are configured for deflection in a direction of the body section upon insertion of the mounting section into the mounting aperture. The second branch further includes an upper side facing the body section. The first branch further includes a lower side facing the upper side of the second branch. The first branch also includes a flange member extending from the lower side, the flange member configured for contacting the upper side of the second branch during insertion of the mounting section into the mounting aperture to limit a deflection of the second branch in the direction of the body section. In aspects, the automotive panel assembly further includes a connector section (as described above) that includes an object support configured to attach to a bundled component (e.g., a bundle of elongate articles).

Example Methods

Also disclosed are methods. The operations (or steps) of a method may include one or more operations that may be performed in, but are not necessarily limited to, the order or combinations described herein. Further, any of one or more of the operations may be repeated, combined, or reorganized to provide other operations utilizing examples techniques of this disclosure.

The disclosed methods include methods of manufacturing anti-wobble fir tree mounts (as described above) configured to attach a component to a supporting structure. In an aspect, a method of manufacturing an anti-wobble fir tree mount includes molding a fir tree mount having a mounting section and a body section. The fir tree mount is configured for attachment to a supporting structure at the mounting aperture defined in the supporting structure. The mounting section includes a mounting stud and plurality of flexible branches extending outwardly from the mounting stud. The branches are configured for deforming (flexing) predominantly in a direction parallel to a direction of insertion of the mounting stud into the mounting aperture through a frontside of the supporting structure. The branches include a first branch extending from the mounting stud and a second branch extending from the mounting stud. The second branch is spaced apart from the first branch. The first branch is positioned between the body section and the second branch. The first branch and the second branch are configured for deflection in a direction of the body section upon insertion of the mounting section into the mounting aperture. The second branch further includes an upper side facing the body section. The first branch further includes a lower side facing the upper side of the second branch. The first branch also includes a flange member extending from the lower side, the flange member configured for contacting the upper side of the second branch during insertion of the mounting section into the mounting aperture to limit a deflection of the second branch in the direction of the body section. In aspects, the method further includes molding a connector section (as described above) that includes an object support configured to attach to a bundled component (e.g., a bundle of elongate articles).

The disclosed methods include methods of assembling anti-wobble fir tree mounts. In an aspect, a method of using an anti-wobble fir tree mount includes attaching a fir tree mount having a mounting section and a body section to a supporting structure at a mounting aperture defined in the supporting structure. The mounting section includes a mounting stud and plurality of flexible branches extending outwardly from the mounting stud. The method includes the operation of inserting the mounting stud into the mounting aperture. The branches are configured for deforming (flexing) predominantly in a direction parallel to a direction of insertion of the mounting stud into the mounting aperture through a frontside of the supporting structure. The branches include a first branch extending from the mounting stud and a second branch extending from the mounting stud. The second branch is spaced apart from the first branch. The first branch is positioned between the body section and the second branch. The first branch and the second branch are configured for deflection in a direction of the body section upon insertion of the mounting section into the mounting aperture. The second branch further includes an upper side facing the body section. The first branch further includes a lower side facing the upper side of the second branch. The first branch also includes a flange member extending from the lower side, the flange member configured for contacting the upper side of the second branch during insertion of the mounting section into the mounting aperture to limit a deflection of the second branch in the direction of the body section. In aspects, the method further includes attaching a component (e.g., bundle of elongate articles) to an object support connected to the fir tree mount.

Additional Examples

Some additional examples of anti-wobble fir tree mounts configured to attach a component to a substrate are as follows:

Example 1. An apparatus comprising: a body section, the body section configured for positioning adjacent a first side of a supporting structure, the body section having a bottom portion; and a mounting section, the mounting section extending from the bottom portion of the body section, the mounting section configured for insertion into a mounting aperture defined in the supporting structure first side, the mounting section comprising: a mounting stud; a first branch extending from the mounting stud; a second branch extending from the mounting stud, the second branch spaced apart from the first branch, the first branch positioned between the body section and the second branch, the first branch and the second branch configured for deflection in a direction of the body section upon insertion of the mounting section into the mounting aperture, the second branch further comprising an upper side facing the body section, the first branch further comprising: a lower side, the lower side facing the upper side of the second branch; and a flange member extending from the lower side, the flange member configured for contacting the upper side of the second branch during insertion of the mounting section into the mounting aperture to limit a deflection of the second branch in the direction of the body section.

Example 2. The apparatus of any other Example, wherein the flange member extends annularly to a longitudinal axis of the mounting stud.

Example 3. The apparatus of any other Example, wherein the flange member further comprises a single flange member segment that extends along the lower side of the first branch.

Example 4. The apparatus of any other Example, wherein the flange member further comprises multiple flange member segments that extend along the lower side of the first branch.

Example 5. The apparatus of any other Example, wherein the first branch further comprises: a root connecting to the mounting stud; an end spaced apart from the root; and a fin portion defined between the root and the end, the fin portion spaced apart from the root and the end, the flange member located on the fin portion, wherein the flange member is spaced apart from the root and the end.

Example 6. The apparatus of any other Example, further comprising: a third branch extending from the mounting stud, the third branch spaced apart from the second branch, the second branch positioned between the body section and the third branch, third branch configured to deform in a direction of the body section upon insertion of the mounting section into the mounting aperture, the third branch further comprising a third branch upper side facing the body section, wherein the second branch further comprises a second flange member extending from a second branch lower side, the second flange member configured for contacting the third branch upper side of the third branch during insertion of the mounting section into the mounting aperture to limit the deflection of the third branch in the direction of the body section.

Example 7. The apparatus of any other Example, wherein the mounting section further comprises a cap portion extending away from the bottom portion of the body section, the cap portion shaped with a profile configured to receive a portion of a branch of the mounting section.

Example 8. The apparatus of any other Example, wherein the portion of the branch of the mounting section received into the profile is the uppermost branch.

Example 9. The apparatus of any other Example, wherein the cap portion comprises an axially extending flange shaped to receive a portion of a branch of the mounting section.

Example 10. The apparatus of any other Example, wherein the portion of the branch of the mounting section received into the profile is the uppermost branch.

Example 11. The apparatus of any other Example, wherein the axially extending flange comprises a plurality of axially extending flanges.

Example 12. The apparatus of any other Example, wherein the second branch further comprises: a lower side, the lower side facing away from the body section; and a flange member extending from the lower side, the flange member configured for contacting an upper side of a third branch during insertion of the mounting section into the mounting aperture to limit a deflection of the third branch in the direction of the body section, wherein the first branch and the second branch each further comprise: a root connecting to the mounting stud; an end spaced apart from the root; and a fin portion defined between the root and the end, the fin portion spaced apart from the root and the end, wherein the flange members of the first branch and the second branch are located on their respective fin portions, the flange members of the first branch and the second branch are spaced apart from their respective roots and ends.

Example 13. The apparatus of any other Example, wherein the first branch and the second branch are branches in an array of branches, wherein multiple of the branches in the array of branches each comprise a flange member.

Example 14. The apparatus of any other Example, further comprising a second array of branches, wherein the array of branches extends along a first peripheral region of the mounting stud and wherein the second array of branches extends along a second peripheral region of the mounting stud.

Example 15. The apparatus of any other Example, wherein the array of branches is offset axially from the second array of branches.

Example 16. The apparatus of any other Example, wherein the first branch and the second branch extend radially from the mounting stud.

Example 17. The apparatus of any other Example, wherein the first branch and the second branch extend radially from the mounting stud partially around the mounting stud.

Example 18. The apparatus of any other Example, wherein the first branch and the second branch extend radially to the mounting stud fully around the mounting stud.

Example 19. The apparatus of any other Example, wherein the first branch and the second branch are branches in an array of branches that extend radially to the mounting stud.

Example 20. The apparatus of any other Example, further comprising: a connector section attaching to the body section, the connector section configured for connecting with an object support configured for attaching to a component.

Example 21. The apparatus of any other Example, wherein the body section further comprises a diaphragm spring configured to contact the first side of the supporting structure and limit the longitudinal insertion of the mounting section into the mounting aperture.

Example 22. The apparatus of any other Example, wherein the first branch extends towards the body section and the second branch extends towards the body section.

Example 23. The apparatus of any other Example, wherein the flange member further comprises: an outer ramp portion extending away from the lower side of the first branch; an inner ramp portion extending away from the lower side of the first branch; and a flat portion extending between the outer ramp portion and the inner ramp portion.

CONCLUSION

Although implementations for anti-wobble fir tree mounts have been described in language specific to certain features and/or methods, the subject of the appended claims is not necessarily limited to the specific features or methods described. Rather, the specific features and methods are disclosed as example implementations for anti-wobble fir tree mounts.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. An apparatus comprising:
  a body section, the body section configured for positioning adjacent to a first side of a supporting structure, the body section having a bottom portion; and
  a mounting section, the mounting section extending from the bottom portion of the body section, the mounting section configured for insertion into a mounting aperture defined in the supporting structure first side, the mounting section comprising:
    a mounting stud;
    a first branch extending from the mounting stud;
    a second branch extending from the mounting stud, the second branch spaced apart from the first branch, the first branch positioned between the body section and the second branch, the first branch and the second branch configured for deflection in a direction of the body section upon insertion of the mounting section into the mounting aperture, the second branch further comprising an upper side facing the body section,
  the first branch further comprising:
    a root connecting to the mounting stud;
    an end spaced apart from the root;
    a lower side, the lower side facing the upper side of the second branch; and
    a flange member extending from the lower side and spaced apart from the end, the flange member configured for contacting the upper side of the second branch during insertion of the mounting section into the mounting aperture to limit a deflection of the second branch in the direction of the body section.

2. The apparatus of claim 1, wherein the flange member extends annularly to a longitudinal axis of the mounting stud.

3. The apparatus of claim 1, wherein the flange member further comprises:
  a single flange member segment that extends along the lower side of the first branch.

4. The apparatus of claim 1, wherein the flange member further comprises:
  multiple flange member segments that extend along the lower side of the first branch.

5. The apparatus of claim 1, wherein the flange member further comprises:
  an outer ramp portion extending away from the lower side of the first branch;
  an inner ramp portion extending away from the lower side of the first branch; and
  a flat portion extending between the outer ramp portion and the inner ramp portion.

6. The apparatus of claim 1, wherein the first branch further comprises:
  a fin portion defined between the root and the end, the fin portion spaced apart from the root and the end, the flange member located on the fin portion, wherein the flange member is further spaced apart from the root.

7. The apparatus of claim 1, further comprising:
a third branch extending from the mounting stud, the third branch spaced apart from the second branch, the second branch positioned between the body section and the third branch, the third branch configured to deform in a direction of the body section upon insertion of the mounting section into the mounting aperture, the third branch further comprising a third branch upper side facing the body section,
wherein the second branch further comprises a second flange member extending from a second branch lower side, the second flange member configured for contacting the third branch upper side of the third branch during insertion of the mounting section into the mounting aperture to limit the deflection of the third branch in the direction of the body section.

8. The apparatus of claim 1, wherein at least one of:
the mounting section further comprises:
a cap portion extending away from the bottom portion of the body section, the cap portion shaped with a profile configured to receive a portion of a branch of the mounting section; or
the portion of the branch of the mounting section received into the profile is an uppermost branch.

9. The apparatus of claim 8, wherein the cap portion comprises an axially extending flange shaped to receive a portion of a branch of the mounting section.

10. The apparatus of claim 9, wherein the axially extending flange comprises a plurality of axially extending flanges.

11. The apparatus of claim 1,
wherein the second branch further comprises:
a lower side, the lower side facing away from the body section; and
a flange member extending from the lower side, the flange member configured for contacting an upper side of a third branch during insertion of the mounting section into the mounting aperture to limit a deflection of the third branch in the direction of the body section,
wherein the first branch further comprises:
a fin portion defined between the root and the end, the fin portion spaced apart from the root and the end,
wherein the second branch further comprises:
a second branch root connecting to the mounting stud;
a second branch end spaced apart from the second branch root; and
a second fin portion defined between the second branch root and the second branch end, the second fin portion spaced apart from the second branch root and the second branch end,
wherein the flange members of the first branch and the second branch are located on their respective fin portions, the flange members of the first branch and the second branch are spaced apart from their respective roots and ends.

12. The apparatus of claim 11, wherein the first branch and the second branch are branches in an array of branches, wherein multiple of the branches in the array of branches each comprise the flange member.

13. The apparatus of claim 12, further comprising a second array of branches, wherein the array of branches extends along a first peripheral region of the mounting stud and wherein the second array of branches extends along a second peripheral region of the mounting stud.

14. The apparatus of claim 13, wherein the array of branches is offset axially from the second array of branches.

15. The apparatus of claim 1, wherein the first branch and the second branch extend radially from the mounting stud.

16. The apparatus of claim 1, wherein the first branch and the second branch are branches in an array of branches that extend radially from the mounting stud.

17. The apparatus of claim 1, further comprising at least one of:
a connector section attaching to the body section, the connector section configured for connecting with an object support configured for attaching to a component; or
the body section further comprising a diaphragm spring configured to contact the first side of the supporting structure and limit the insertion of the mounting section into the mounting aperture.

18. The apparatus of claim 1, wherein the first branch extends towards the body section and the second branch extends towards the body section.

19. An apparatus comprising:
a body section, the body section configured for positioning adjacent to a first side of a supporting structure, the body section having a bottom portion; and
a mounting section, the mounting section extending from the bottom portion of the body section, the mounting section configured for insertion into a mounting aperture defined in the supporting structure first side, the mounting section comprising:
a mounting stud;
a first branch extending from the mounting stud;
a second branch extending from the mounting stud, the second branch spaced apart from the first branch, the first branch positioned between the body section and the second branch, the first branch and the second branch configured for deflection in a direction of the body section upon insertion of the mounting section into the mounting aperture, the second branch further comprising an upper side facing the body section,
the first branch further comprising:
a lower side, the lower side facing the upper side of the second branch; and
a flange member extending from the lower side, the flange member extending annularly to a longitudinal axis of the mounting stud, the flange member configured for contacting the upper side of the second branch during insertion of the mounting section into the mounting aperture to limit a deflection of the second branch in the direction of the body section.

20. An apparatus comprising:
a body section, the body section configured for positioning adjacent to a first side of a supporting structure, the body section having a bottom portion; and
a mounting section, the mounting section extending from the bottom portion of the body section, the mounting section configured for insertion into a mounting aperture defined in the supporting structure first side, the mounting section comprising:
a mounting stud;
a first branch extending from the mounting stud;
a second branch extending from the mounting stud, the second branch spaced apart from the first branch, the first branch positioned between the body section and the second branch, the first branch and the second branch configured for deflection in a direction of the body section upon insertion of the mounting section into the mounting aperture, the second branch further comprising an upper side facing the body section, the first branch further comprising:
- a lower side, the lower side facing the upper side of the second branch; and
- a flange member extending from the lower side, the flange member includes multiple flange member segments that extend along the lower side of the first branch, the flange member configured for contacting the upper side of the second branch during insertion of the mounting section into the mounting aperture to limit a deflection of the second branch in the direction of the body section.

* * * * *